United States Patent
Maas et al.

(10) Patent No.: US 7,491,321 B1
(45) Date of Patent: Feb. 17, 2009

(54) OXIDATION TANK CONTROL VALVE ASSEMBLY AND SYSTEMS AND METHODS FOR REPLENISHING A CHARGE OF OXYGEN-CONTAINING GAS WITHIN AN OXIDATION TANK

(75) Inventors: Edward T. Maas, Poynette, WI (US); Paul A. Beres, Waukesha, WI (US); Kevin A. Hellenbrand, Mukwonago, WI (US); William M. Kavey, Sun Prairie, WI (US); Daniel A. Klein, Middleton, WI (US)

(73) Assignee: Hellenbrand, Inc., Waunakee, WI (US)

(*) Notice: Subject to any disclaimer, the term of this patent is extended or adjusted under 35 U.S.C. 154(b) by 241 days.

(21) Appl. No.: 11/458,279

(22) Filed: Jul. 18, 2006

(51) Int. Cl.
*B01D 21/30* (2006.01)

(52) U.S. Cl. .................. 210/136; 210/278; 210/138; 210/198.1; 210/205; 210/209; 210/220; 210/418; 137/488; 137/511; 137/624.13; 137/625

(58) Field of Classification Search ............... 210/136, 210/278, 277, 279, 424, 138, 198.1, 205, 210/209, 418; 137/484.2, 488, 489, 511, 137/515, 515.3, 515.5, 515.7, 565.27, 588, 137/624.12, 624.13, 624.18, 625
See application file for complete search history.

(56) References Cited

U.S. PATENT DOCUMENTS

| | | | |
|---|---|---|---|
| 3,649,532 A | 3/1972 | McLean | |
| 4,534,867 A | 8/1985 | Kreusch et al. | |
| 5,096,596 A | 3/1992 | Hellenbrand et al. | |
| 5,945,004 A | 8/1999 | Ohira et al. | |
| 6,042,729 A | 3/2000 | Chau | |
| 6,068,764 A | 5/2000 | Chau | |
| 6,231,763 B1 | 5/2001 | Chau | |
| 6,254,772 B1 | 7/2001 | Chau | |
| 6,398,954 B2 | 6/2002 | Chau | |
| 6,447,678 B2 | 9/2002 | Chau | |
| 6,797,156 B2 | 9/2004 | Chau | |
| 2003/0164337 A1* | 9/2003 | Maas et al. | .......... 210/138 |

* cited by examiner

*Primary Examiner*—Matthew O. Savage
*Assistant Examiner*—Lucas Stelling
(74) *Attorney, Agent, or Firm*—Lathrop & Clark LLP

(57) ABSTRACT

Contaminants are removed from fluid in a system where the fluid is sprayed into an air head at the top of a tank through a diffuser and withdrawn through a pick-up tube. A solenoid valve operates to allow oxygen-containing gas from a compressed gas source to flow into the tank through a shuttle valve, which is opened by the gas pressure. Simultaneously, a drain valve connected to the shuttle valve opens a drain, venting water and air from the tank. The solenoid valve also operates to close the gas supply line and connect the shuttle valve through a vent to atmosphere. Pressure within the tank closes the shuttle valve, which in turn closes the drain valve and disconnects the shuttle valve from the tank. A one-way-flow valve prevents fluid or gas from flowing from the tank backwards through the shuttle valve to the solenoid valve and out the vent.

27 Claims, 8 Drawing Sheets

OXIDATION TANK CONTROL VALVE ASSEMBLY AND SYSTEMS AND METHODS FOR REPLENISHING A CHARGE OF OXYGEN-CONTAINING GAS WITHIN AN OXIDATION TANK

BACKGROUND OF THE INVENTION

1. Field of the Invention

This invention is directed to a control valve assembly usable with an oxidation tank and systems and methods for using such a control valve assembly.

2. Related Art

A variety of fluids, including well water, commonly contain oxidizable contaminants, impurities, constituents or the like. For example, well water often contains naturally occurring mineral contaminants. Iron, sulfur, and manganese, which are frequently found in well water, are objectionable in well water and other potable water, as they add undesirable odors and/or taste to the water. These oxidizable constituents may also stain plumbing fixtures and/or corrode and/or clog pipes.

Oxidizable constituents in a fluid are commonly removed from the fluid by entraining an oxygen-containing gas into the fluid and passing the treated fluid through a bed of calcium carbonate or dolomite. This raises the pH level of the fluid and facilitates precipitation of the undesirable oxidizable constituents. The increased pH fluid may then be passed through one or more filter media to remove the precipitated oxidizable constituents. Commonly, the oxygen-containing gas is added to the fluid by passing the fluid through a pipe section of decreasing cross-sectional area with a gas inlet known as a venturi nozzle.

Treatment systems employing venturi nozzles to "aerate" the fluid present certain difficulties in service and operation. If the fluid contains other sediments, strainers are commonly installed upstream of the venturi nozzle to remove the sediment in the fluid that would otherwise obstruct the venturi nozzle. Maintaining the correct differential pressure between the pump and the pressure tank of the system that insures the venturi nozzle operates properly is difficult. Gas introduced upstream of the pressure tank may cause pipes to plug ahead of the pressure tank. The strainer and the venturi nozzle both increase the pressure drop in the fluid system, which may have an adverse effect on the amount of fluid needed to backwash the system. In addition to these maintenance and operation difficulties, the venturi nozzle only operates when the fluid is flowing through the system.

Although it is known to substitute an air pump for a venturi nozzle in a filtration system, such systems remain dependent on the fluid flow in the fluid system to bring fresh oxygen to the fluid. U.S. Pat. No. 5,096,596, which is incorporated herein by reference in its entirety, discloses systems and methods for injecting air or other oxygen-containing gas directly into an air head of an aeration tank, using a controller having a timer to automatically actuate a source of compressed oxygen-rich gas and/or supply an oxygen-containing gas to an oxidation tank at preselected times. U.S. Published Patent Application 2003-0164337 (now allowed) discloses a novel multi-valve control system useable to controllably supply a fresh charge of an oxygen-containing gas to an oxidation tank. The oxygen-containing gas is introduced into a supplied fluid by dispersing or diffusing a spray of droplets of the fluid into a charge of the oxygen-containing gas contained within the oxidation tank. The fluid typically contains one or more oxidizable constituents or contaminants. The mist or spray of droplets absorbs some of the oxygen-containing gas, or at least oxygen from the oxygen-containing gas, from the charge of gas contained within the tank as the fluid falls through the charge of oxygen-containing gas. The oxygen absorbed into the fluid reacts with the oxidizable contaminants or constituents of the fluid, and oxidizes them to form oxide compounds. These oxide compounds typically precipitate out of solution from the fluid and thus can be filtered from the fluid.

As the oxygen content of the oxygen-containing gas is consumed, it is desirable to replace the current charge of oxygen-containing gas with a fresh charge of the oxygen-containing gas. As disclosed in the 337 Published application, this is accomplished by activating the disclosed multi-valve control system. In particular, in the exemplary embodiment disclosed in the 337 Published application, a controlled valve is moved from a first position to a second position. In the first position, the controlled valve connects an interior chamber within a valve assembly of the multi-valve control system to an ambient atmosphere. In the second position, the controlled valve disconnects the interior chamber from the ambient atmosphere and connects the interior chamber to a higher-pressure supply of the oxygen-containing gas.

A second valve is located within the interior chamber. In a first position, the second valve closes off a first flow passage from the interior chamber into the interior of the oxidation tank. In the first position, the second valve also allows a third valve to disconnect a second flow passage out of the interior of the oxidation tank from a drain line. In a second position, the second valve opens the first flow passage between the interior chamber and the interior of the oxidation tank and operates the third valve to connect the second flow passage from the first flow passage to the drain line.

In response to the higher-pressure gas in the interior chamber when the controlled valve is in the second position, the second valve moves from the first position to the second position. This allows a fresh charge of the oxygen-containing gas, which has flowed into the interior chamber from the supply of oxygen containing gas, to flow from the interior chamber through the first flow passage into the interior of the oxidation tank. This fresh charge of the oxygen-containing gas drives the current, stale charge of the oxygen-containing gas, and possibly some of the fluid, from the interior of the oxidation tank out through the second flow path, past the third valve and into the drain line. Consequently, the fresh charge of the oxygen-containing gas replaces the stale charge of the oxygen-containing gas in the interior of the oxidation tank.

Once the fresh charge of oxygen-containing gas is in place in the interior of the oxidation tank, the controlled valve is returned from the second position to the first position. This cuts off the supply of higher-pressure oxygen-containing gas to the interior chamber and re-connects the interior chamber to the ambient atmosphere.

As a result, the higher-pressure oxygen-containing gas within the interior chamber escapes to the ambient atmosphere, and the pressure in the interior chamber drops to the level of the lower-pressure ambient atmosphere. In response, the second valve automatically returns from the second position to the first position, disconnecting the first flow passage from the interior chamber. This also traps the fresh charge of oxygen-containing gas in the interior of the oxidation tank. Additionally, the second valve, as it returns to the first position, allows the third valve to return to its first position where the second flow path is disconnected from the drain line.

SUMMARY OF THE DISCLOSED EMBODIMENTS

However, it should be appreciated that, in various exemplary embodiments, the multi-valve control system is designed to use the line pressure of the fluid passing through the oxidation tank to drive the second valve from the second position to the first position. That is, in various exemplary embodiments, during operation, the pressure in the interior of the oxidation tank is equal to the inlet line pressure of the fluid supply. Accordingly, the oxidized fluid leaving the oxidation tank through the outlet line, past the second valve, is also at the inlet line pressure. Because this pressure is greater than the ambient atmospheric pressure, the line pressure in the outlet line drives the second valve from the second position to the first position.

Unfortunately, if the interior of the oxidation tank is not at or near the line pressure, there may be insufficient force on the second valve to drive the second valve from the second position to the first position. Accordingly, the second valve can remain in the second position, even after the first valve is returned to the first position. There are a variety of causes for the internal pressure within the oxidation tank being below the line pressure. One such cause is a reduction in the inlet line pressure, such as when the fluid supply is shut off upstream of the oxidation tank for repairs to the fluid supply systems. Another cause is failure to follow proper start-up procedures, such as rapidly applying full line pressure to the fluid inlet of the control valve system. Even if the interior of the oxidation tank is at the appropriate internal pressure, the second valve can become fouled, such that the internal pressure in the oxidation tank is insufficient to move the second valve from the second position to the first position.

When the second valve fails to return to the first position from the second position, the second flow passage from the interior of the oxidation tank remains connected to the drain line, while the first flow passage into the interior of the oxidation tank remains connected to the interior chamber. This can allow oxidized fluid to improperly flow to the drain line and/or out the first flow passage and into the interior chamber. This can also allow the current charge of oxygen-containing gas to escape to the ambient atmosphere or out the drain line. That is, if the first valve is in the first position, oxidized fluid from the oxidation tank can leak out to the ambient atmosphere. If the first valve is in the second position, the oxidized fluid can flow into the supply of oxygen-containing gas, such as a pump or a compressed gas cylinder.

This invention provides a multi-valve control system that reduces back flow of gas and/or fluid from the oxidation tank to an upstream portion of the valve assembly or control system.

This invention separately provides a multi-valve control system that prevents back flow of gas and/or fluid from the oxidation tank to an upstream portion of the valve assembly system.

This invention separately provides a one-way flow structure that reduces back flow of gas and/or fluid from the oxidation tank to an upstream portion of the valve assembly.

This invention separately provides a one-way flow structure that prevents back flow of gas and/or fluid from the oxidation tank to an upstream portion of the valve assembly.

This invention separately provides a check valve in an upstream flow path that reduces back flow of gas and/or fluid from the oxidation tank to an upstream portion of the valve assembly.

This invention separately provides a check valve in an upstream flow path that prevents back flow of gas and/or fluid from the oxidation tank to an upstream portion of the valve assembly.

This invention separately provides a duck-billed check valve that reduces back flow of gas and/or fluid from the oxidation tank to an upstream portion of the valve assembly.

This invention separately provides a duck-billed check valve that prevents back flow of gas and/or fluid from the oxidation tank to an upstream portion of the valve assembly.

This invention separately provides a one-way flow structure in a flow passage between an interior chamber of the valve assembly and an interior of the oxidation tank.

This invention separately provides a check valve in a flow passage between an interior chamber of the valve assembly and an interior of the oxidation tank.

This invention separately provides a duck-bill check valve in a flow passage between an interior chamber of the valve assembly and an interior of the oxidation tank.

This invention separately provides a multi-valve control system that is not sensitive to start-up procedures and/or loss of line pressure.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein.

DETAILED DESCRIPTION OF EXEMPLARY EMBODIMENTS

Many different types of fluids contain contaminants or other unwanted impurities, constituents, components or the like. Many such contaminants or unwanted impurities, components etc. are oxidizable into a form that can be more easily removed from the fluid. One common fluid/constituent pair where this is true is dissolved iron in water. Accordingly, the following detailed description of various exemplary embodiments of oxidation tank multi-valve control system and related valve assemblies according to this invention will focus on removing iron and other oxidizable impurities, contaminants and/or the like from water. That is, for ease of description and understanding, the following detailed description focuses on oxidizing and removing iron from water. However, it should be appreciated that any other type of known or later-developed oxidizable element, compound, composition, chemical or the like that is present in any other appropriate type of known or later-developed fluid can be oxidized and removed from that fluid using any embodiment of an oxidation tank multi-valve control system and related valve assembly according to this invention.

Figure 1:
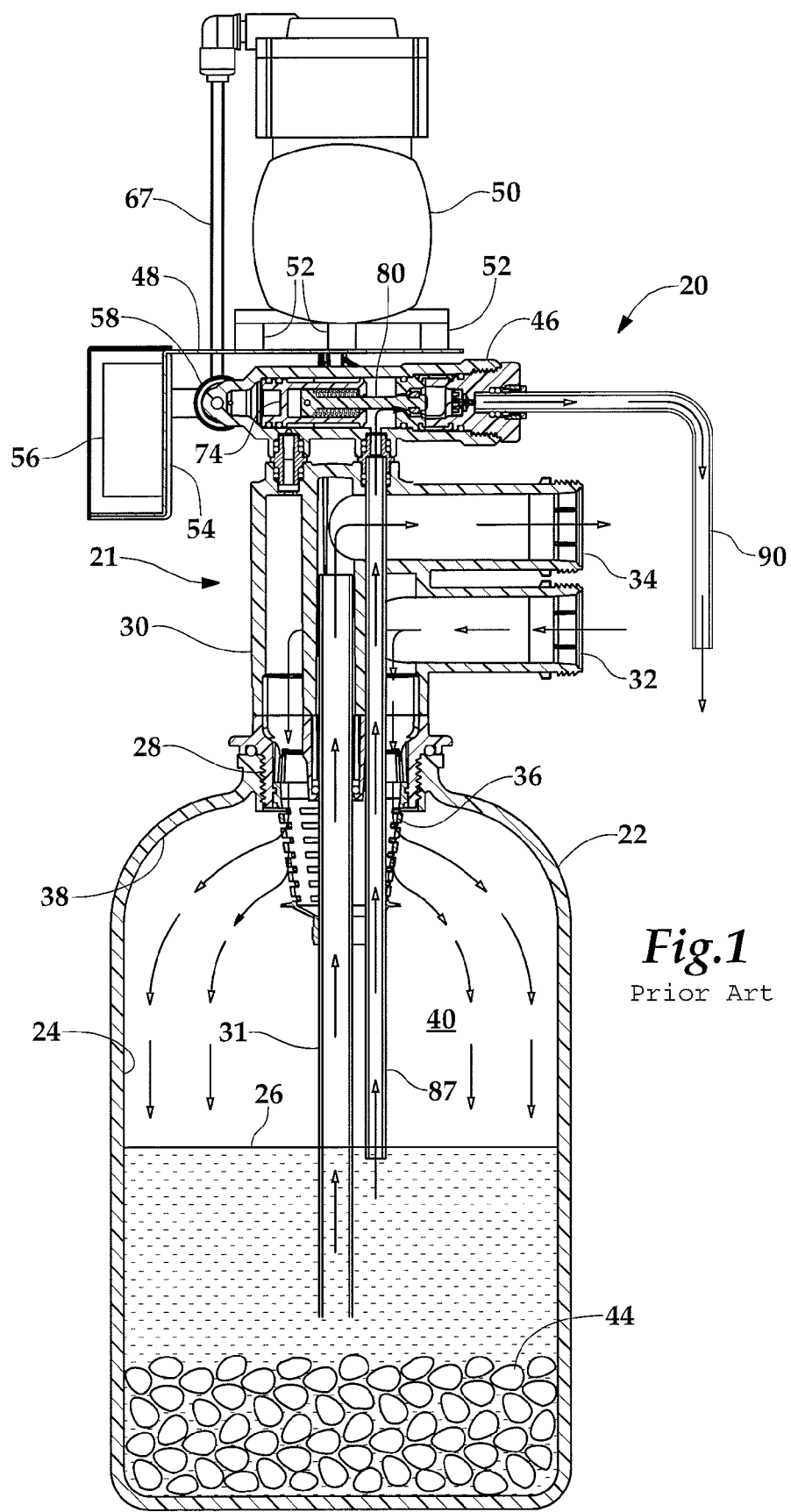
FIG. 1 is a side cross-sectional and plan view of a conventional oxidation tank and one exemplary embodiment of an oxidation tank control valve assembly according to this invention.

FIG. 1 is a side cross-sectional and side plan view of a conventional oxidation tank and multi-valve control system. In particular, FIG. 1 shows an aeration control system 20. As shown in FIG. 1, the aeration control system 20 has an aeration tank 22, which has a pressure containing wall 24. The aeration tank 22 is partially filled with water or other fluid 26 and has a threaded top opening 28 into which is screwed an aeration head 30 of an aeration control valve assembly 21 is screwed. In various exemplary embodiments, the aeration head 30 can be constructed of glass-filled Noryl® brand of modified polyphenylene oxide and polyphenylene ether. In various exemplary embodiments, the aeration control valve assembly 21 conveniently assembles the elements of the aeration control system 20 and mounts them to the aeration tank 22 by a single screw-on connection. The aeration control valve assembly 21 includes a shuttle valve housing 46, which is fixed to the aeration head 30, and which, in various exemplary embodiments, supports an air compressor 50 and/or a controller 56.

The aeration head 30 has a supply inlet 32 and a supply outlet 34. In the exemplary embodiment shown in FIG. 1, the supply inlet 32 and supply outlet 34 are shown offset from each other vertically for illustrative purposes. However, in various other exemplary embodiments the supply inlet 32 and the supply outlet 34 are at the same vertical level. The supply inlet 32 is connected to a diffuser 36, which causes water flowing from the supply inlet 32 to spray into an air head 40 provided in the top portion 38 of the aeration tank 22. In various exemplary embodiments, an air head 40 occupies at least about six inches of the top portion 38 of the aeration tank 22. As water is sprayed from the diffuser 36 into the air head 40, the water absorbs oxygen from the air or other oxygen-containing gas provided in the air head 40.

By increasing the dissolved oxygen content of the water or other fluid 26 in the aeration tank 22, various oxidizable contaminants, impurities, constituents or the like, such as dissolved elements and/or minerals, including iron, may be oxidized to produce a precipitate that can be removed. The precipitate may be removed from water or other fluid 26 that exits the aeration tank 22 through the supply outlet 34 to a filter tank or system.

A pick-up tube 31 extends into the water or other fluid 26 contained within the aeration tank 22. The pick-up tube 31 also extends upwardly through the diffuser 36 and is fluidly connected to the supply outlet 34. That is, the pick-up tube 31 fluidly communicates with the supply outlet 34. A bleed-off tube 87 also extends from within the aeration tank 22, through the diffuser 36, and into the aeration head 30. The bleed-off tube 87 is fluidly connectable to a drain line 90. In various exemplary embodiments, the bottom of the aeration tank 22 may contain granules of calcium carbonate or other compound, composition or the like 44 that is useable to increase the pH of the water or other fluid 26, which can aid in the precipitating the iron or other oxidized constituent of the water or other fluid 26. In various other exemplary embodiments, the granules of calcium carbonate or the like 44 are omitted.

As shown in FIG. 1, in various exemplary embodiments, the shuttle valve housing 46 is positioned on top of the aeration head 30. In various exemplary embodiments, the shuttle valve housing 46 is constructed of blended polyethylene terephthalate. In various exemplary embodiments, a support bracket 48 is also connected to the top of the aeration head 30. In various exemplary embodiments, an air compressor 50 is supported on resilient feet 52 on top of the support bracket 48. In various exemplary embodiments, the resilient feet 52 are connected to the support bracket 48. The support bracket 48 has a vertical flange 54. A controller 56 is mounted to the vertical flange 54. A solenoid 58 is mounted to this vertical flange 54 opposite the controller 56.

The controller 56 periodically, such as, for example, every four to forty-eight hours, turns on the air compressor 50 for a preset period, such as, for example, about five to fifteen minutes. The controller 56 energizes the solenoid 58 for the same period of time. That is, in various exemplary embodiments, the controller 56 controllably and concurrently operates both the air compressor 50 and the solenoid 58, so that the solenoid 58 is energized only while the air compressor 50 is running. It should be appreciated that a typical time for the air compressor 50 and the solenoid 58 to be operated is about 6 minutes to about 10 minutes.

Figure 2:
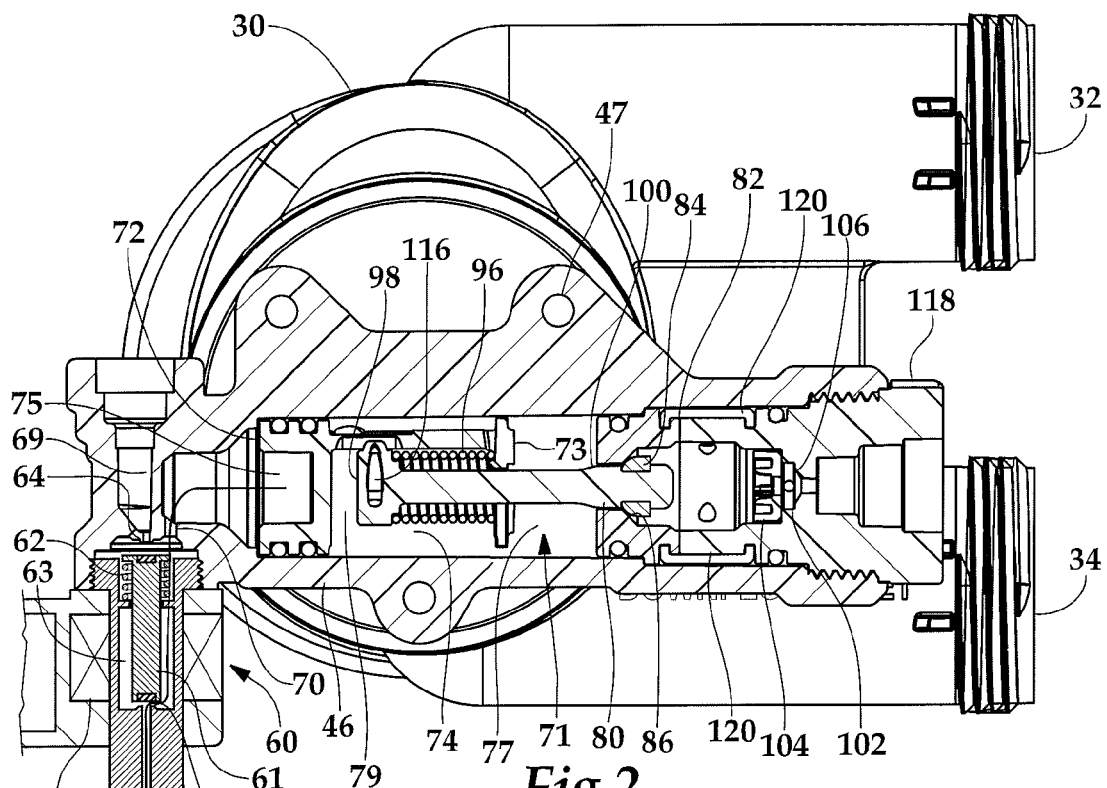
FIG. 2 is a top cross-sectional view of the known oxidation tank control valve assembly of FIG. 1 showing a solenoid valve in a first position.
Figure 3:
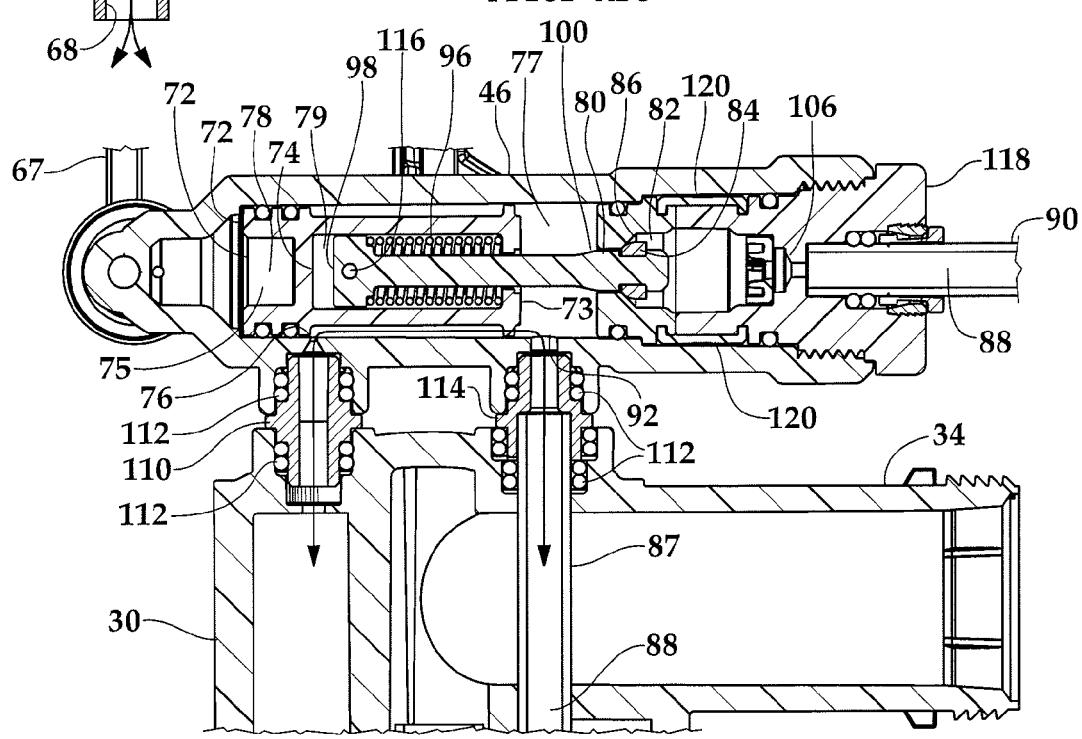
FIG. 3 is a side cross-sectional view showing in greater detail the oxidation tank control valve assembly shown in FIG. 1, where each of a shuttle valve and a poppet valve are in their first positions.
Figure 4:
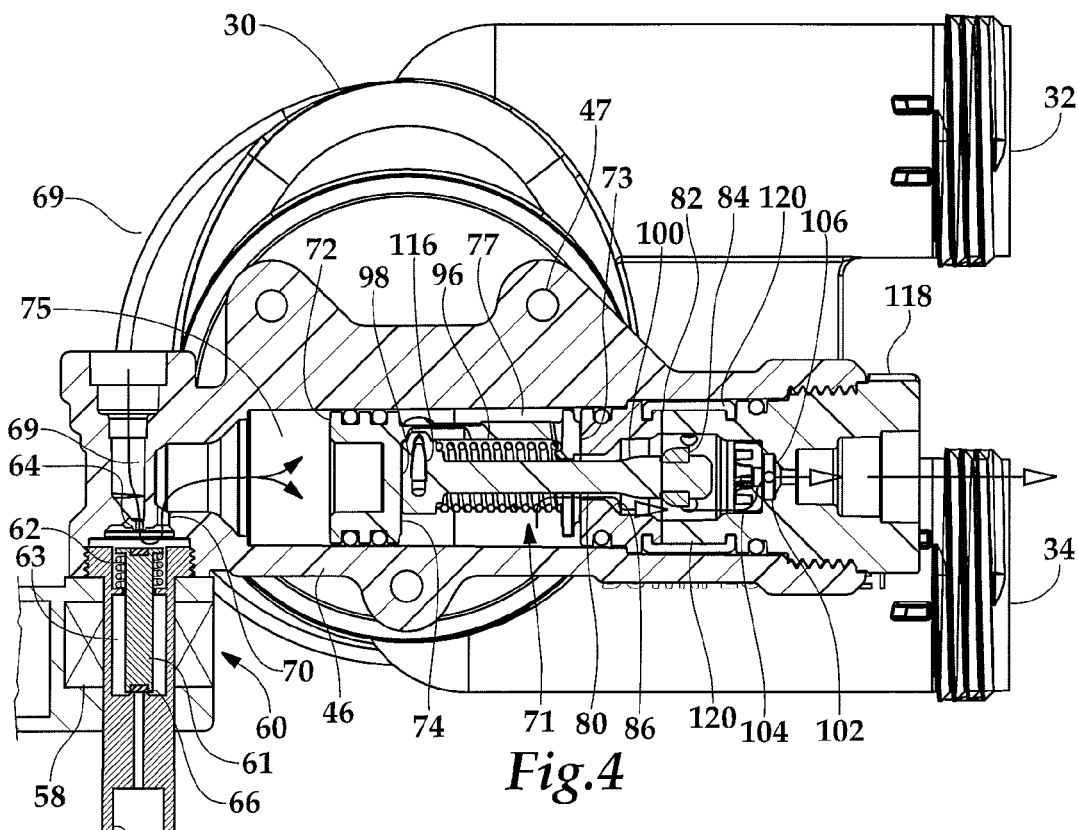
FIG. 4 is the top cross-sectional view of the oxidation tank control valve assembly of FIG. 2 with the solenoid valve in a second position.
Figure 5:
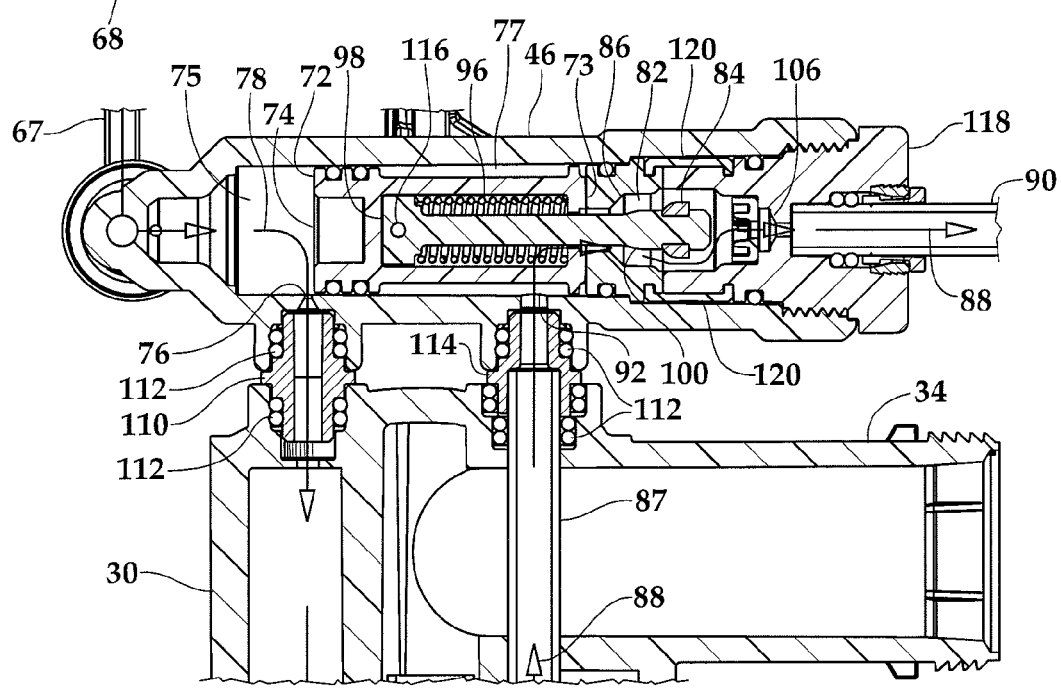
FIG. 5 is the side cross-sectional view of the oxidation tank control valve assembly of FIG. 3, with both of the shuttle valve and the poppet valve in their second positions.

As shown in FIG. 1, the shuttle valve housing 46 also includes a shuttle valve piston 74, which moves within an interior chamber 71 between a first position, shown in FIGS. 2 and 3, and a second position, shown in FIGS. 4 and 5. A poppet valve stem 80 is located within and extends from an upstream end of the shuttle valve piston 74. The poppet valve stem 80 connects and disconnects the bleed-off tube 87 to the drain line 90. The bleed-off tube 87 controls the position of the air head 40 by draining a portion of the water or other fluid 26 until the bleed-off tube 87 no longer extends into the water or other fluid 26.

It should be appreciated that, in operation, the aeration tank 22 is provided with a compressed or pressurized charge of air or other oxygen-containing gas. This gas is provided by the air compressor 50 at a pressure that is greater than the atmospheric pressure of the ambient atmosphere in which the aeration tank 22 is located and greater than the line pressure of the fluid supply connected to the supply inlet 32.

In contrast, the charge of air or oxygen-containing gas in the air head 40 will be at a pressure that is equal to the line pressure of the water in the supply inlet 32, which will also be the line pressure of the fluid in the supply outlet 34. That is, the aeration tank 22 acts as a capacitor for the water or other fluid 26. The water or other fluid 26 enters the aeration tank from the supply inlet 32 at a line pressure of the supply line attached to the supply inlet 32. If the aeration tank 22 did not include the charge of air or other oxygen-containing gas, the aeration tank 22 would fill with the water or other fluid 26. Assuming the supply outlet 34 is the same size as the supply inlet 32, the water or other fluid 26 would flow out of the supply outlet 34 at that same line pressure.

However, when the charge of air or other oxygen-containing gas is provided in the air head 40 of the aeration tank 22, the aeration tank 22 does not fill with the water or other fluid 26. Rather, as the aeration tank 22 begins to fill, the charge of air or other oxygen-containing gas in the air head 40 of the aeration tank 22 is compressed. In particular, the aeration tank 22 fills at a rate that depends on the line pressure of the fluid supply line connected to the supply inlet 32. At the same time, because the charge of air in the air head 40 is initially compressed and is further compressed as the aeration tank 22 is filled, the compressed charge of air or other oxygen-containing gas in the air head 40 presses against the water or other fluid 26 filling the bottom portion of the aeration tank 22.

Assuming the charge of compressed air or other oxygen-containing gas is not so large that the level of the air head 40 in the top of the aeration tank 22 does not reach the bottom of the pick-up tube 31, the water or other fluid 26 in the bottom of the aeration tank 22 is pushed up the pick-up tube 31 and out the supply outlet 34. The aeration tank 22 continues filling until the flow rate of the water or other fluid 26 flowing out of the supply outlet 34 is equal to the flow rate of the water or other fluid 26 flowing into the aeration tank 22 from the supply inlet 32. Assuming the supply inlet 32 and the supply outlet 34 are the same size, equilibrium will be reached when the fluid outlet line pressure will be the same as the fluid inlet pressure, and both will be the same as the pressure in the charge of air or other oxygen-containing gas the air head 40.

FIGS. 2 and 4 are each a top cross-sectional view of the shuttle valve housing 46 viewed down from above the aeration control valve assembly 21 shown in FIG. 1. FIGS. 3 and 5 each show in greater detail the cross sectional view of the shuttle valve housing 46 of FIG. 1. In various exemplary embodiments, the shuttle valve housing 46 is held in place by three screws (not shown), which pass through three screw holes 47. The screws also pass through the support bracket 48, shown in FIG. 1, to connect the support bracket 48 and the shuttle valve housing 46 to the aeration head 30. As shown in greater detail in FIGS. 2 and 3, the shuttle valve piston 74 moves within the interior chamber 71 formed in the shuttle valve housing 46. A number of O-rings or other seal structures divide the interior chamber 71 into an upstream interior chamber 75 and a downstream interior chamber 77. Because the shuttle valve piston 74 moves within the interior chamber 71 between the first and second positions, the relative sizes and extents of the upstream and downstream interior chambers 75 and 77 depend on the location of the shuttle valve piston 74 within the interior chamber 71.

The shuttle valve piston 74 includes a first or upstream face 72 that is upstream of the O-rings or other seal mechanism and thus is located within the upstream interior chamber 75. A second or downstream face 73 of the shuttle valve piston 74 is downstream of the O-rings or other seal mechanism and thus is located within the downstream interior chamber 77. The shuttle valve piston 74 also includes a recess 79 in which the poppet valve stem 80 is located. The recess 79 opens onto the downstream face 73 of the shuttle valve piston 74.

As shown in FIGS. 2-5, besides the poppet valve stem 80, a spring 96 and a retaining pin or screw are also provided in the recess 79. The spring 96 is located between a bearing surface provided at an interior end 98 of the poppet valve stem 80 that is within the recess 79 and a retaining surface formed in the interior of the recess 79. Thus, the spring 96 acts to push the poppet valve stem 80 deeper into the recess 79. Accordingly, except for the situations outlined below, the interior end 98 of the poppet valve stem 80 is biased against the bottom of the recess 79, such that the poppet valve stem 80 normally moves with the shuttle valve piston 74.

As shown in FIGS. 2-5, the poppet valve stem 80 has the interior, or base, interior end 98 located in the recess 79. The other, free, end of the poppet valve stem 80 includes a rubber valve seat 84 and a conical surface 100 located inwardly from the rubber valve seat 84. A poppet valve seat 86 is positioned in a poppet valve orifice 82. The valve seat end of the poppet valve stem 80 extends through the poppet valve orifice 82 and the poppet valve seat 86.

As shown in FIGS. 2 and 3, in a first position, the poppet valve stem 80 has moved away from the drain line 90, such that the rubber valve seat 84 on the free end of the poppet valve stem 80 engages with the poppet valve seat 86 to close the poppet valve orifice 82. As a result, the downstream interior chamber 77 is disconnected from the drain line 90. This means that the third flow passage 92, the bleed-off tube 87 and the interior of the aeration tank 22 are also disconnected from the drain line 90.

As shown in FIGS. 4 and 5, in a second position, the poppet valve stem 80 has moved toward the drain line 90, such that the rubber valve seat 84 has disengaged from the poppet valve seat 86, opening the poppet valve orifice 82. As a result, one or both of the oxygen-containing gas and/or a portion of the water or other fluid 26, or other oxidized fluid in the interior of the aeration tank 22, flows up the bleed-off tube 87, through the third flow passage 92, the downstream interior chamber 77, the conical surface 100 and the orifice in the resilient washer 102, and into the drain line 90.

Downstream of the poppet valve orifice 82 and the end of the poppet valve stem 80, a resilient washer 102 sits in a conical valve seat 106. The resilient washer 102 includes a hole or orifice that allows the water or other fluid 26, and/or other oxidizable fluid and/or the air or other oxygen-containing gas, to flow past the poppet valve stem 80, out of the shuttle valve housing 46 and into the drain line 90. The resilient washer 102 is held in place in the conical valve seat 106 by a retainer 104. In various exemplary embodiments, in operation, as the water or other fluid 26, etc. flows through the orifice in the resilient washer 102, the orifice in the resilient washer 102 elongates and become smaller to maintain a substantially constant flow of water or other fluid 26 or other oxidizable fluid as pressure increases and the resilient washer 102 is forced against a conical valve seat 106. Thus, in various exemplary embodiments, over a wide pressure range, flow through the orifice in the resilient washer 102 is restricted to about 0.5 to about 1.0 gallon per minute.

In various exemplary embodiments, the volume of the charge of air can be sufficiently large that the level of the water or other fluid 26 in the bottom of the aeration tank 22 does not reach the bottom of the bleed-off tube 87. In this case, the bleed-off tube 87, which is connected to the downstream interior chamber 77, will allow the charge of air or other oxygen-containing gas to bear against the downstream face 73 of the shuttle valve piston 74 at least the supply line pressure. In contrast, the volume of the charge of air or other oxygen-containing gas can be smaller, such that the bottom of the bleed-off tube 87 is below the level of the water in the bottom of the aeration tank 22. In this case, the downstream interior chamber 77 will be filled with the water, which has been forced up the bleed-off tube 87 by the supply pressure from the supply inlet 32 and/or by the compressed charge of air or other oxygen-containing gas in the air head 40. In either case, the gas and/or water or other fluid 26 in the downstream interior chamber 77 will be at or near the supply line pressure.

As shown in FIGS. 2-5, a solenoid valve 60 is contained within the solenoid 58. The solenoid valve 60 has a solenoid valve stem 61, which moves within a solenoid valve chamber 63 between a first position, shown in FIGS. 2 and 3, and a second position, shown in FIGS. 4 and 5. As shown in FIGS. 2 and 3, in the first position, a first end of the solenoid valve stem 61 engages a first valve seat 64. In contrast, as shown in FIGS. 4 and 5, in the second position, a second, opposite end of the solenoid valve stem 61 engages a second valve seat 66. The solenoid valve chamber 63 is fluidly connected, via a first flow passage 70, to the upstream interior chamber 75 of the interior chamber 71 provided within the shuttle valve housing 46. The first valve seat 64 leads from a supply of oxygen-containing gas to the solenoid valve chamber 63. In contrast, the second valve seat 66 leads from the solenoid valve chamber 63 to an atmospheric exhaust port 68. The atmospheric exhaust port 68 leads to an ambient atmosphere. The solenoid valve stem 61 is biased towards or into the first position, i.e., against the first valve seat 64, by a spring 62, and moves to the second position, i.e., against the second valve seat 66, when the solenoid 58 is energized.

As shown in FIGS. 2 and 3, when the solenoid 58 is not energized and the aeration tank 22 is appropriately pressurized, that pressure in the aeration tank 22 drives the shuttle valve piston 74 into the first position. This occurs because the solenoid valve stem 61 is in the first position when the solenoid 58 is not energized. In this first position, the solenoid valve stem 61 is disengaged from the second valve seat 66, connecting the solenoid valve chamber 63 to the ambient atmosphere. Because the upstream interior chamber 75 is fluidly connected to the solenoid valve chamber 63 via the first flow passage 70, both of the solenoid valve chamber 63 and the upstream interior chamber 75 are thus at the ambient atmosphere pressure. Because this ambient atmospheric pressure is less than the supply line pressure in the aeration tank 22, the pressure of the fluid and/or gas within the aeration tank 22, and thus the downstream interior chamber 77, forces the shuttle valve piston 74 toward the upstream end of the interior chamber 71.

In contrast, as shown in FIGS. 4 and 5, when the controller 56 turns on the air compressor 50 and energizes the solenoid 58, compressed air or other oxygen-containing (i.e., oxidizing) gas flows from the air compressor 50 through a flexible conduit 67, shown in FIG. 1, into the solenoid valve 60. When the solenoid 58 is energized, the solenoid valve stem 61 moves from the first position to the second position. As a result, the first end of the solenoid valve stem 61 disengages from the first valve seat 64 and engages the second valve seat 66. Consequently, the solenoid valve chamber 63 is disconnected from the ambient atmosphere and is connected to the supply of oxygen-containing gas supplied by the air compressor 50 through the flexible conduit 67.

Because the upstream interior chamber 75 is fluidly connected to the solenoid valve chamber 63 via the first flow passage 70, the upstream interior chamber 75 thus also becomes disconnected from the ambient atmosphere and instead becomes connected to the supply of oxygen-containing gas. That is, the supplied air and/or other oxygen-containing gas in the air head 40 and in the flexible conduit 67 is prevented from flowing out of the atmospheric exhaust port 68 and into the ambient atmosphere when the solenoid valve stem 61 is seated against the second valve seat 66. Rather, the supplied air or other oxygen-containing gas flows through the solenoid valve chamber 63 in the solenoid valve 60, as shown by arrows 69, and through the first flow passage 70 into the upstream interior chamber 75 provided in the shuttle valve housing 46.

As a result, as shown in FIGS. 4 and 5, when the solenoid 58 is energized and the air compressor 50 is actuated, compressed air or other oxygen-containing gas, at a pressure that is greater than the supply line pressure, enters the solenoid valve chamber 63, the first flow passage 70 and the upstream interior chamber 75. In the upstream interior chamber 75, the compressed air or other oxygen-containing gas presses against the upstream face 72 of the shuttle valve piston 74. Because the pressure of the supplied gas is greater than the line pressure in the downstream interior chamber 77, the shuttle valve piston 74 moves toward the downstream end of the interior chamber 71.

In various exemplary embodiments, the interior chamber 71 and the shuttle valve piston 74 are sized such that, when the shuttle valve piston 74 moves to the downstream end of the interior chamber 71, the shuttle valve piston 74 moves sufficiently to uncover an opening or second flow passage 76 that leads from the interior chamber 71 through a passage in the aeration head 30 and into the interior of the aeration tank 22. Accordingly, as indicated by the arrows 78, the compressed air or other oxygen containing gas supplied by the air compressor 50 can enter the aeration tank 22. Thus, as shown in FIGS. 4 and 5, at the same time that the shuttle valve piston 74 moves to the right to open the second flow passage 76, the poppet valve stem 80 that is located internally in the recess 79 of the shuttle valve piston 74 is moved to the right, opening the drain or poppet valve orifice 82 by unseating the elastomeric or rubber valve seat 84 from the poppet valve seat 86. The poppet valve orifice 82 allows air and/or other oxygen-containing gas and/or the water or other fluid 26 to flow from the bleed-off tube 87, as indicated by the arrows 88, to the drain line 90.

After the air compressor 50 operates for the determined period, the controller 56 turns the air compressor 50 off and de-energizes the solenoid 58, allowing the spring 62 to return the solenoid valve stem 61 from its second position to its first position and press the solenoid valve stem 61 against the first valve seat 64. As described above, moving the solenoid valve stem 61 from the second position to the first position opens a passageway for the compressed air or other oxygen-containing gas to flow from the upstream interior chamber 75 of the shuttle valve housing 46, through the first flow passage 70, the solenoid valve chamber 63 of the solenoid valve 60 and the atmospheric exhaust port 68 to the ambient atmosphere. At the same time, the pressure within the aeration tank 22 is applied, via the bleed-off tube 87 and the third flow passage 92, into the downstream interior chamber 77 and against the downstream face 73 of the shuttle valve piston 74. This moves the shuttle valve piston 74 toward the upstream end of the interior chamber 71 and closes the second flow passage 76 from the upstream interior chamber 75 of the interior chamber 71.

As indicated above, the spring 96 holds the interior or interior end 98 of the poppet valve stem 80 against the interior end of the recess 79, shown in FIG. 3, in the shuttle valve piston 74. As a result, the shuttle valve piston 74, when it moves toward the upstream end of the interior chamber 71, moves the poppet valve stem 80 in that same direction until the rubber valve seat 84 re-engages the poppet valve seat 86 to close the poppet valve orifice 82 and thus disconnects the interior of the aeration tank 22 from the drain line 90.

As indicated above, the poppet valve orifice 82 is closed by the spring 96, holding the interior or interior end 98 of the poppet valve stem 80 against the interior end of the recess 79 provided in the shuttle valve piston 74 when the shuttle valve piston 74 is in the first position. However, if sufficient pressure exists within the aeration tank 22, the poppet valve orifice 82 will be open as the pressure within the aeration tank acts against the conical surface 100 and the rubber valve seat 84 of the poppet valve stem 80. That is, when the force of the pressure within the aeration tank 22 acting on the conical surface 100 and the rubber valve seat 84 is greater than the force applied to the poppet valve stem 80 in the opposite direction by the spring 96, the poppet valve stem 80 will move toward the drain line 90. The poppet valve orifice 82 thus acts as a pressure relief valve. The relief pressure is controlled by the effective radial area of the conical surface 100, which creates the opening force, and the opposing force applied to the poppet valve stem 80 by the spring 96.

As shown in FIGS. 3 and 5, the second flow passage 76 from the interior chamber 71 of the shuttle valve housing 46 to the aeration head 30 is sealed to the aeration head 30 by an adaptor 110 and a number of O-rings 112 located in the passage in the aeration head 30. In a similar manner, the third flow passage 92, through which the bleed-off tube 87 communicates with the shuttle valve housing 46, is connected to the aeration head 30 by a second adaptor 114 and a number of O-rings 112. The adaptors 110 and 114 allow the simple assembly and replacement of the shuttle valve housing 46 to the aeration head 30.

The poppet valve stem 80 is retained within the shuttle valve piston 74 by the screw 116. In particular, the screw 116 moves within a slot (not shown) formed in the shuttle valve piston 74. The poppet valve seat 86 is connected to a shuttle valve end cap 118 by a pair of split collars 120. The split collars 120 allow the shuttle valve piston 74 to be removed from the shuttle valve end cap 118. The drain line 90 extends into the shuttle valve end cap 118. The conical valve seat 106 is formed in the shuttle valve end cap 118.

Figure 6:
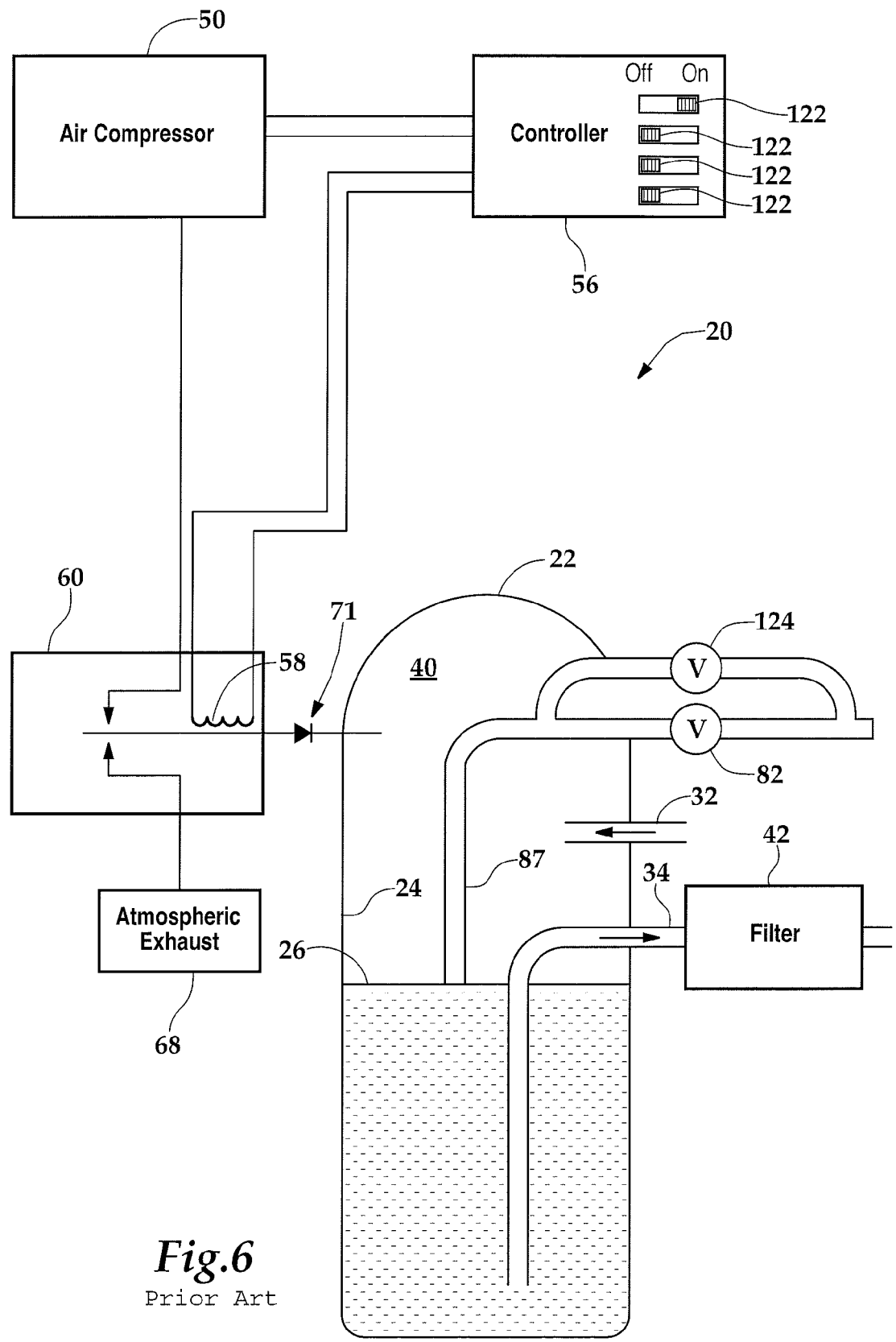
FIG. 6 is a schematic view of the oxidation tank and oxidation tank control valve assembly shown in FIG. 1.

FIG. 6 schematically illustrates the operation of the aeration control system 20. When power is applied to the controller 56, the controller 56 turns on the air compressor 50 and energizes the solenoid 58 for a defined first period, such as, for example, 10 minutes. At the end of the defined first period, the air compressor 50 and the solenoid 58 are turned off by the controller 56. After a second defined period of time, such as, for example, between four hours and forty-eight hours, the controller 56 again turns on the air compressor 50 and energizes the solenoid 58 for the defined first period.

For first and second periods of 10 minutes and 4+ hours, the air compressor 50 is on for less than about four percent of the time that the air compressor 50 is off. This cycle is repeated as long as power is supplied to the controller 56. The controller 56 is programmable using, for example, four switches 122, which can each be individually turned on or off. The four switches 122 thus define a four bit value between zero and 15. In the configuration shown in FIG. 6, the switches are set to a value of "0001", which instructs the controller 56 to use a four-hour-long second period between 10-minute-long first periods. If the 4-bit value is set to two, the controller 56 uses an eight-hour-long second period, a 4-bit value of three corresponds to a 12-hour-long second period, and so on. The 4-bit values 12, 13, and 14 correspond to a 48-hour-long second period.

A 4-bit value of zero ("0000") places the controller 56 into a test mode, where the air compressor 50 and the solenoid 58 are turned on for 10 seconds, i.e., a 10-second-long first period, followed by a four-minute-long second period, and followed by another 10-second-long first period. Setting the 4-bit value to 15 ("1111") puts the aeration control system 20 into a switch testing mode. In the switch testing mode, the controller 56 is turned on. Thereafter, the air compressor 50 and solenoid 58 turn on and off every second. Moving any of the switches to the "off" (or zero) position turns on the air compressor 50 and the solenoid 58. Moving any of the switches back to the "on" (or one) position turns the air compressor 50 and the solenoid 58 off.

In various other exemplary embodiments, the controller 56 is programmable using, for example, a wheel or dial that can be turned to set the desired interval. In these exemplary embodiments, the dial has discrete positions that correspond to various intervals. In various exemplary embodiments, the intervals include some or all of a 1-hour interval, a 2-hour interval, a 4-hour interval, an 8-hour interval, a 12-hour interval, a 16-hour interval, a 20-hour interval, a 24-hour interval, a 28-hour interval, a 32-hour interval, a 36-hour interval, a 40-hour interval, a 44-hour interval, a 48-hour interval, and the like. It should be appreciated that other intervals can be provided on the dial in addition to, or in place of, one or more of the intervals indicated above. It should be appreciated that any other known or later developed circuitry usable to set or modify one or both of the first and second periods to desired or pre-defined values can be implemented in the controller 56 in place of the 4 switches described above. The structures and methods used to set these intervals are not critical to systems and methods according to this invention.

The solenoid valve 60 connects the upstream interior chamber 75 either to the atmospheric exhaust port 68 or the flexible conduit 67 and thus to the air compressor 50. When the upstream interior chamber 75 is connected to the air compressor 50 and the air compressor 50 is on, the shuttle valve piston 74 is displaced from the first position to the second position to allow air to flow into the air head 40. When the upstream interior chamber 75 is connected to the atmospheric exhaust port 68, the shuttle valve piston 74 is displaced from the second position to the first position by the line pressure within the aeration tank 22 to close the flow passage or second flow passage 76, which prevents the air or other oxygen-containing gas from escaping the air head 40 through the upstream interior chamber 75. Air or other oxygen-containing gas within the upstream interior chamber 75 of the shuttle valve is bled off through the atmospheric exhaust port 68 to permit the line pressure within the aeration tank 22 to fully close communication between the upstream interior chamber 75 and the air head 40 of the aeration tank 22.

When the air compressor 50 is connected to the upstream interior chamber 75, moving the shuttle valve piston 74 from the first position to the second position also displaces the poppet valve orifice 82 from the poppet valve seat 86 to allow water and air to bleed-off from the air head 40 to the drain line 90. FIG. 6 shows a second valve 124 is performing the pressure relief function discussed above. This function, by the design of the poppet valve stem 80, has been incorporated into the poppet valve stem 80, so that the poppet valve stem 80 both bleeds off the old charge of air or other oxygen-containing gas and fluid from the aeration tank 22 and relieves any over pressure within the aeration tank 22.

In the conventional exemplary embodiment shown in FIGS. 1-6, line pressure in the interior of the aeration tank 22 is used to ensure that, when the solenoid 58 is not energized, the shuttle valve piston 74 is in the first position and the second flow passage 76 is disconnected from the upstream interior chamber 75 and thus the open atmospheric exhaust port 68. However, if the line pressure in the aeration tank 22 is lost, for any of a variety of reasons, and/or the line pressure becomes insufficient to move the shuttle valve piston 74 from the second position to the first position, the shuttle valve piston 74 can remain in the second position after the solenoid 58 is de-energized. When this occurs, the second flow passage 76 improperly remains fluidly connected to the atmospheric exhaust port 68.

Loss of the correct line pressure in the aeration tank 22 can occur in a number of different and generally unrelated and independent situations. One such situation occurs when the start-up instructions for the aeration control valve assembly 21 are not properly followed. Failure to follow the start-up instructions can inadvertently occur in a number of different ways. For example, installers installing the aeration control system 20 often open an upstream inlet water supply valve slightly to check for leaks. This practice works fine for controls that are not designed to function using a pressure differential. However, the aeration control valve assembly 21 requires pressure to build quickly for the shuttle valve piston 74 to function as intended.

The aeration control valve assembly 21 may vent water or air out of the atmospheric exhaust port 68 as quickly as water enters the aeration tank 22 when a supply valve upstream of the supply inlet 32 is only partially opened or is opened slowly or gradually. In fact, in this situation, the pressure in the interior of the aeration tank 22 may never be high enough to move the shuttle valve piston 74 to its first position. The start-up procedures also direct that electrical power be applied to the controller 56, which will energize the solenoid 58 to close the atmospheric exhaust port 68, before applying line supply pressure to the aeration control system 20. If these start-up procedures are not properly followed, the aeration control valve assembly 21 shown in FIGS. 1-6 will not work properly.

Another such situation occurs when the water supply is turned off upstream of the supply inlet 32, but the electrical power supply to the controller 56 and/or the solenoid 58 is not turned off. This can occur when a service contractor or home owner turns the water service off when servicing the plumbing system. This will depressurize the aeration control system 20. That is, this can occur, for example, when the plumbing system is drained down to repair an appliance or faucet. Then, while the water system is depressurized, the air recharge cycle occurs.

While the aeration control system 20 is depressurized, the controller 56, because it was not turned off, cycles by energizing the solenoid 58 and turning on the air compressor 50, thus supplying compressed gas to the upstream interior chamber 75. As outlined above, the controller 56 does not initiate a recharge cycle at a specific time of day. Rather, recharge cycles are initiated by the controller 56 at adjustable time intervals, such as, for example, 2 hours of off-time between recharge cycles, 12 hours of off-time between recharge cycles or the like.

Supplying compressed gas to the upstream interior chamber 75 pushes the shuttle valve piston 74 from the first position to the second position, thus opening the second flow passage 76. Additionally, when the shuttle valve piston 74 moves from the first position to the second position, this causes the poppet valve stem 80 to move from its first position to its second position, disengaging the rubber valve seat 84 from the poppet valve seat 86 to open the poppet valve orifice 82. This results in connecting the third flow passage 92 to the drain line 90. As outlined above, when the third flow passage 92 is connected to the drain line 90, the interior pressure in the aeration tank 22 forces water and/or oxidizing gas through the third flow passage 92 and out the drain line 90. That is, the shuttle valve piston 74 moves to the second, or open, position by the pressure differential created from the air pressure from the air compressor 50. However, at the end of the air recharge cycle, after the air compressor 50 is turned off, there isn't any water pressure on the downstream face 73 to move the shuttle valve piston 74 back to the first position.

It is common practice for the plumber or other repair person to reapply the water pressure to the plumbing system slowly while checking for leaks on the repairs just performed. The person performing this repair service may have little or no understanding about the aeration control system 20 shown in FIGS. 1-6 and that it requires a pressure differential to function properly. Accordingly, this person is inadvertently ignorant of the proper start-up procedures for the aeration control valve assembly 21 and inadvertently fails to follow them, causing the aeration control valve assembly 21 to operate improperly.

Moreover, occasionally, fluid treatment oxidation systems, such as the aeration control system 20, are applied to fluid conditions outside of their design parameters. For example, the aeration control system 20 can be used with water or other fluid 26 that has iron and/or sulfur-related bacteria present in the water. These types of nuisance bacteria thrive in water supplies that are oxygen rich. In particular, fluid treatment oxidization systems such as the aeration control system 20 provide an oxygen rich environment, both within the oxidation tank and in the shuttle valve housing 46. Typically, nuisance bacteria build up where air and water or other fluid may be in contact with various ports of the shuttle valve housing 46 or the aeration head 30.

In particular, the interior chamber 71, the shuttle valve piston 74, the spring 96 and/or the passageway from the downstream interior chamber 77 to the drain line 90 can become plugged or fouled with bacterial growth, such that a higher force is needed to move the shuttle valve piston 74 from the second position to the first position. In such situations, when the recharge cycle ends, electrical power is removed from the solenoid 58 and the air compressor 50. This opens the atmospheric exhaust port 68, which allows the gas pressure applied to the forward or upstream face 72 of the shuttle valve piston 74 to be vented to the ambient atmosphere.

In the exemplary embodiment shown in FIGS. 1-6, until the shuttle valve piston 74 shuttles to the first, or closed, position, air pressure is applied from the charge of gas in the air head 40 to the forward or upstream face 72 of the shuttle valve piston 74 through the second flow passage 76 and the passages through the adaptor 110 and the aeration head 30 that communicate with the top portion 38 of the aeration tank 22. In various exemplary embodiment the atmospheric exhaust port 68 can be up to 15% greater in size (or more) than the second flow passage 76 that communicates between the interior chamber 71 and the top of the aeration tank.

As outlined above, the bleed-off tube 87 extends down into the water or other fluid 26 in the aeration tank 22. In normal operation, the water/air pressure that is applied via the bleed-off tube 87 to the downstream interior chamber 77 and thus the downstream face 73 of the shuttle valve piston 74, can easily overcome the air pressure due to this differential port sizing. In various exemplary embodiments, the bleed-off tube 87 that carries the bleed-off water/air from the interior of the aeration tank 22 into the downstream interior chamber 77 is up to 500% greater in dimension (or more) than the second flow passage 76. In some instances, the pressure differential between the upstream face 72 and the downstream face 73 is not enough to overcome the added resistance to movement of the shuttle valve piston 74 caused by the bacterial biomass build up. Consequently, the shuttle valve piston 74 becomes lodged in the second, or open, position. This requires service to clean the shuttle valve housing 46.

It is also possible for the controller 56 to fail while in the ON position, that is, when the solenoid 58 and the air compressor 50 are energized. As a result, the solenoid 58 and the air compressor 50 would run continuously. The solenoid 58 will be held in the second position, while the air compressor 50 will run until the thermal overload on the motor of the air compressor 50 automatically shuts down the air compressor 50. In the exemplary embodiment shown in FIGS. 1-6, once the air compressor 50 shuts down, the charge of gas in the interior of the aeration tank 22 could be lost by backflow through the air compressor 50. Eventually, after the charge of air or other oxidizing gas in the interior of the aeration tank 22 has dissipated sufficiently, the water or other fluid 26 fills the aeration tank 22 sufficiently that the water or other fluid 26 flows up the diffuser 36, the aeration head 30, through the second flow passage 76, the upstream interior chamber 75, the solenoid valve chamber 63 and the flexible conduit 67 and back through the air compressor 50.

It should also be appreciated that, in the exemplary embodiment shown in FIGS. 1-6, when the shuttle valve piston 74 is in the first or closed position, open communication is provided bilaterally between the second flow passage 76, the third flow passage 92, the aeration tank 22, and the downstream or downstream face 73 of the shuttle valve piston 74 when the shuttle valve piston 74 is in the first or closed position. This allows the air or other oxygen-containing gas in the air head 40 to migrate higher into the shuttle valve housing 46, while water migrates lower into the aeration tank 22, due to natural different densities of air and water. As indicated above, allowing the oxygenized gas into the shuttle valve housing 46 promotes growth of iron and/or sulfur-eating bacteria that can clog the shuttle valve housing 46

It should be appreciated that the aeration tank 22 can operate with any known or later-developed filter system and can supply aerated water or other fluid continuously even while the air head 40 is being recharged. It should be understood that the aeration control system 20 can be used with a water supply containing arsenic to facilitate or improve the amount of arsenic removed by an arsenic removal filter.

FIGS. 7-12 show a first exemplary embodiment of an improved aeration control valve assembly 21 according to this invention. In particular, in various exemplary embodiments, improved oxidation tank control valve assemblies according to this invention include one or more additional valve devices or structures that act to obviate one or more of the above-outlined problems that can occur with the aeration control valve assembly 21 shown in FIGS. 1-6. Additionally, in view of these one or more additional valve devices or structures, it becomes possible to redesign or simplify other operational aspects of the aeration control valve assembly 21 shown in FIGS. 1-6. In particular, the inventors have discovered that, while the aeration control valve assembly 21 shown in FIGS. 1-6 does not have any inherent design flaws when used as designed, that device has various unintended or unanticipated operational states that can be accessed when the aeration control valve assembly 21 is used improperly or when one or more elements of the oxidation tank control valve assembly fail.

In particular, the inventors have determined, by analyzing these various operational states that result in device failure, leakage of fluid or the like, that such problems occur at least in part, due to the unrestricted, 2-way flow path between the air head 40 in the interior of the aeration tank 22 and the solenoid valve chamber 63 via the aeration head 30, the second flow passage 76 and the upstream interior chamber 75 when the shuttle valve piston 74 is in the second position within the interior chamber 71. That is, the inventors have discovered that these problems occur, at least in part, because the oxygen-containing gas and the water or other fluid 26 are able to flow from the air head 40 to the solenoid valve chamber 63 in the conventional aeration control valve assembly 21 shown in FIGS. 1-6 under various operational conditions. Accordingly, the inventors have determined that, by placing at least one one-way-flow valve structure or device in the flow path between the solenoid valve chamber 63 and the air head 40, at least some, if not all, of these problems can be reduced, or ideally, avoided.

FIGS. 7-12 illustrate one exemplary embodiment of an improved aeration control valve assembly 21 according to this invention that includes at least one such one-way-flow valve structure or device. It should be appreciated that there are various other exemplary embodiments of improved oxidation tank control valve assemblies according to this invention. These other exemplary embodiments are discussed in detail, but are not shown, following the discussion of FIGS. 7-12.

In particular, in the exemplary embodiment shown in FIGS. 7-12, this at least one one-way-flow valve structure or device is a duckbill-type check valve. However, it should be appreciated that, in various other exemplary embodiments, one or more one-way-flow valves in addition to, or in place of, the duckbill check valve shown in FIGS. 7-12 can be used in the improved aeration control valve assembly 21. Thus, while the following detailed descriptions of various exemplary embodiments according to this invention refer to a duckbill check valve in particular, it should be appreciated that any other known or later-developed check valve or other one-way-flow valve structure or device that can be incorporated into the flow path between the solenoid valve chamber 63 and the air head 40 of the aeration control valve assembly 21 can be used in the improved aeration control valve assembly 21 according to this invention.

Figure 7:
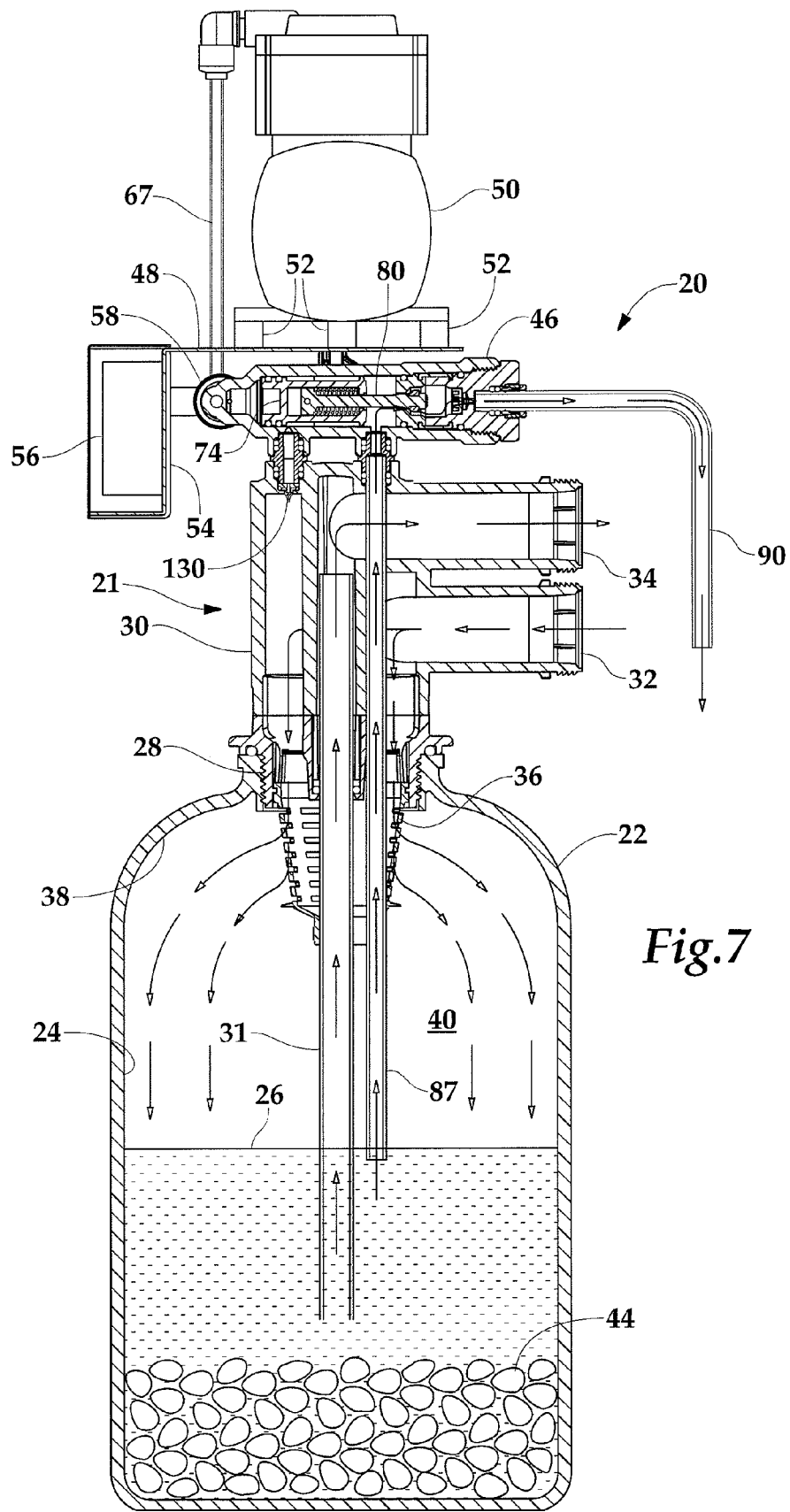
FIG. 7 is a side cross-sectional and plan view of an oxidation tank and one exemplary embodiment of an oxidation tank control valve assembly according to this invention.

As shown in FIG. 7, and as shown in greater detail in FIGS. 8-11, in various exemplary embodiments of the improved aeration control valve assembly 21 according to this invention, a duckbill check valve 130, which is one exemplary embodiment of a one-way-flow valve, is located in the flow path from the solenoid valve chamber 63 to the air head 40. In particular, in the exemplary embodiment shown in FIG. 7, the duckbill check valve 130 is located downstream of the second flow passage 76 and upstream of the diffuser 36. It should be appreciated that, in various exemplary embodiments, the second flow passage 76 can encompass the entire flow path from the interior chamber 71 to the interior of the aeration tank 22. In particular, the duckbill check valve 130 is positioned such that when the pressure in the second flow passage 76 upstream of the duckbill check valve 130 is greater than the pressure within the aeration head 30, gas and/or other fluids can flow through the duckbill check valve 130 from the second flow passage 76 into the aeration head 30. In contrast, when the pressure within the aeration head 30 is greater than the pressure within the second flow passage 76, the duckbill check valve 130 does not allow any gas or fluids to flow from the aeration head 30 to the second flow passage 76. This is shown in greater detail in FIGS. 8 and 9.

As shown in FIGS. 8-11, the duckbill check valve 130 comprises an elastomeric and/or elastically-deformable duckbill portion 132 and a substantially dimensionally stable retainer element 134. This elastomeric duckbill portion 132 is generally circular at a top or upstream end and narrows down to two opposing bill portions at its bottom or downstream end. A small passageway is provided between the two bill portions when the bill portions are moved away from each other. In contrast, when the two bill portions are forced towards each other, the passageway becomes tightly sealed. In particular, each bill portion of the duckbill portion of the duckbill check valve 130 is shaped to translate any pressure or force on its outer surface into lateral translational motion towards the other bill portion. In contrast, pressure on the interior surfaces of the bill portions of the elastomeric duckbill portion 132 of the duckbill check valve 130 generally acts to force apart the two bill portions of the duckbill portion 132, unless, of course, the pressure on those interior surfaces is less than the pressure on the outer surfaces of the duckbill portion 132.

Thus, the duckbill check valve 130 acts as a one-way-flow valve based on the pressure differential between the pressure within the aeration head 30 and the pressure within the second flow passage 76, and ultimately within the solenoid valve chamber 63. Because this is exactly the same pressure differential that is used to move the shuttle valve piston 74 between the first position, as shown in FIG. 8, and the second position, as shown in FIG. 9, using the duckbill check valve 130 typically does not require any redesign or change in operation of the aeration control valve assembly 21.

Figure 8:
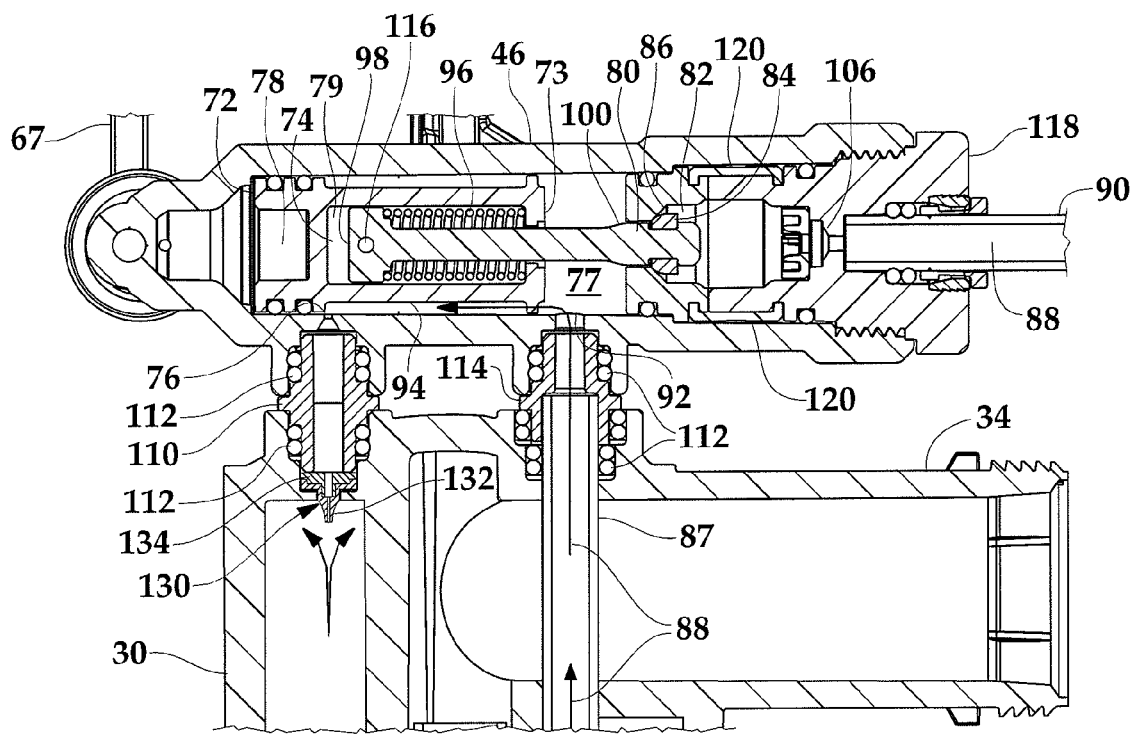
FIG. 8 is a side cross-sectional view of the oxidation tank control valve assembly of FIG. 7, including a duckbill check valve and with both of the shuttle valve and the poppet valve in their first positions.
Figure 9:
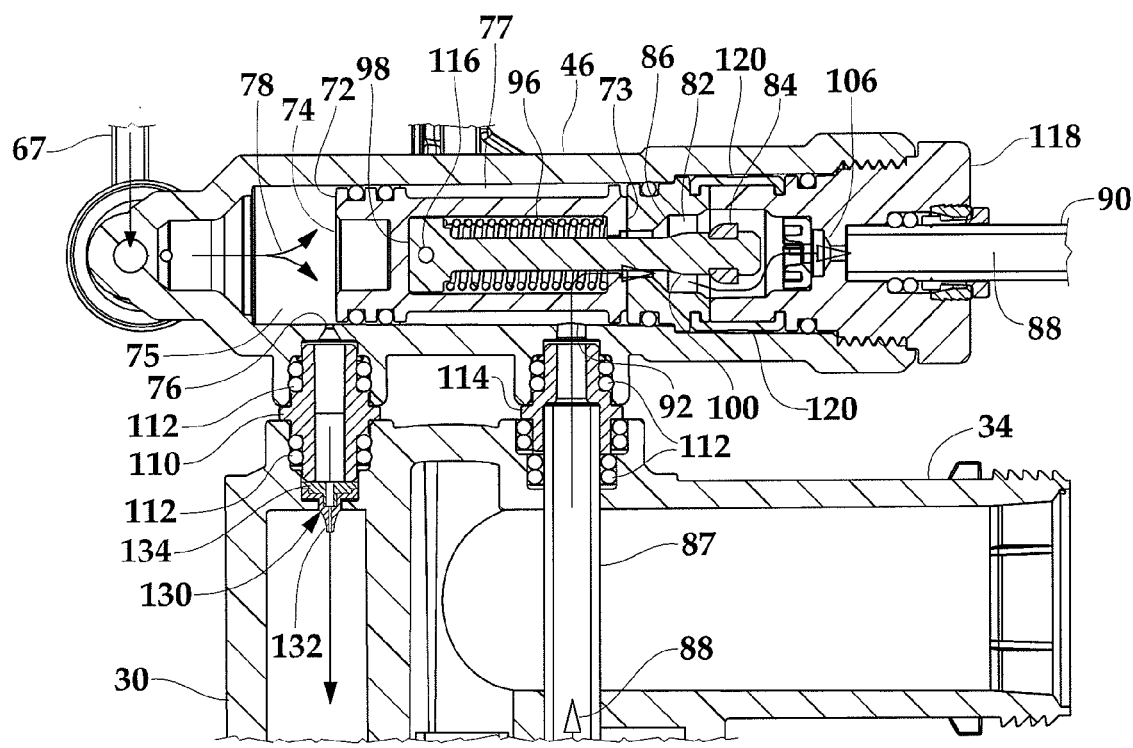
FIG. 9 is a side cross-sectional view of the oxidation tank control valve assembly of FIG. 7, including the duckbill check valve and with both of the shuttle valve and the poppet valve in their second positions.
Figure 10:
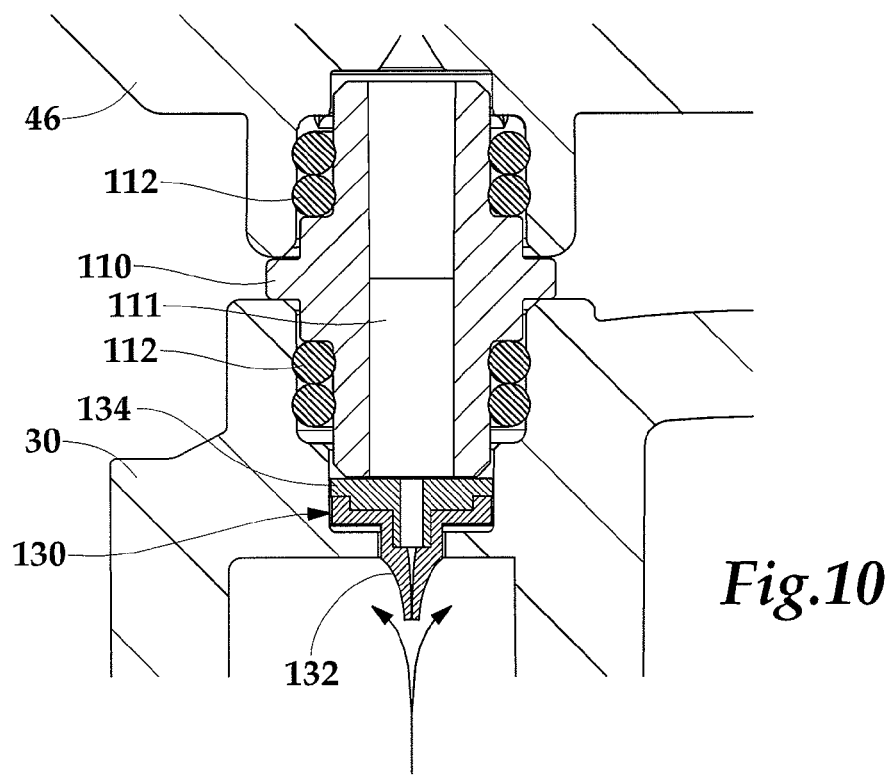
FIG. 10 is a side cross-sectional view showing in greater detail the aeration head, adaptor and duckbill check valve of FIG. 8.
Figure 11:
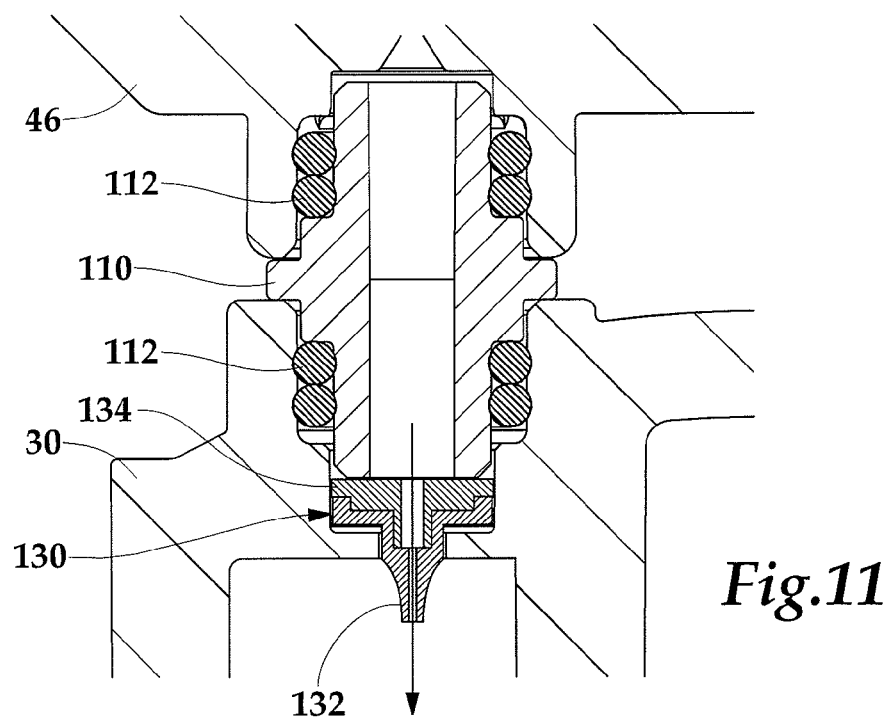
FIG. 11 is a side cross-sectional view showing in greater detail the aeration head, adaptor and duckbill check valve of FIG. 9.

FIGS. 8 and 9 show the upper portion of the aeration head 30 and shuttle valve housing 46. FIGS. 10 and 11 show the second flow passage 76, the adaptor 110, the top of the aeration head 30 and the duckbill check valve 130 in even greater detail. FIG. 8 shows the shuttle valve piston 74 in the first position, with the pressure within the air head 40 pressing against the downstream face 73 of the shuttle valve piston 74. In contrast, FIG. 9 shows the shuttle valve piston 74 in the second position, with the higher-pressure gas from the air compressor 50 pressing against the upstream face 72 of the shuttle valve piston 74.

As shown in FIG. 8, the higher pressure oxidizing gas that is present in the air head 40 at the top of the aeration tank 22, and thus present in the aeration head 30, presses on the curved or duckbill portion 132 of the elastomeric duckbill check valve 130, pushing the two elastic bill portions of the elastomeric duckbill portion 132 of the duckbill check valve 130 tightly together, thus closing the duckbill check valve 130.

As shown in FIGS. 10 and 11, to provide additional sealing between the aeration head 30, the adaptor 110 and the shuttle valve housing 46, the duckbill portion 132 generally fits somewhat snuggly through the passageway, provided at the top of the aeration head 30, that leads into the interior of the aeration head 30, although it need not do so. Additionally, the duckbill check valve 130 fits closely within the recess provided at the top of the aeration head 30 that the adaptor 110 is placed into. The retainer element 134 is then inserted into the interior of the duckbill portion 132 and forces the upstream end of the elastomeric duckbill portion 132 tightly against the interior surfaces of the recess of the aeration head 30 into which the adaptor 110 is inserted.

This tends to generate a tight press or interference fit of the retainer element 134 and the upstream end of the duckbill portion 132. Accordingly, the bottom wall portion of the upstream portion of the duckbill portion 132 can be tightly pressed down against the bottom of the recess for the adaptor 110 formed in the top of the aeration head 30. This provides a tight, high-resistance, generally flow-free seal between the duckbill check valve 130 and the inner surfaces of the recess formed in the aeration head 30. Thus, it is difficult, if not impossible, for any fluid to flow from the aeration head 30 to the second flow passage 76 around, rather than through, the duckbill check valve 130.

It should be appreciated that, in various other exemplary embodiments, rather than placing a one-way-flow valve, such as the duckbill check valve 130, between the adaptor 110 and within the recess formed at the top of the aeration head 30, the one-way flow valve can be placed on top of and/or within the adaptor 110. For example, in various exemplary embodiments, the duckbill check valve 130 is placed on top of the adaptor 110 before the shuttle valve housing 46 is placed on and around the top of the adaptor 110 and the duckbill check valve 130. In such exemplary embodiments, the duckbill portion 132 sits on top of the adaptor 110 and extends into a central passage 111 formed in the adaptor 110. Additionally, the retainer element 134 and the top of the duckbill portion 132 are sized so that the duckbill check valve 130 fits snugly into the recess formed in the bottom of the shuttle valve housing 46 below the second flow passage 76.

In various other exemplary embodiments, the duckbill check valve 130 or other one-way-flow valve is placed within the central passage 111 formed within the adaptor 110. In such exemplary embodiments, the retainer element 134 fits within the top of the duckbill portion 132. As a result, the elastomeric material forming the duckbill portion 132 is compressed between the inner wall of the central passage 111 within the adaptor 110 and the retainer element 134. Thus, a tight fit or seal is formed between the inner wall of the central passage 111 within the adaptor 110 and the duckbill check valve 130.

As discussed above, to place the shuttle valve piston 74 in its first position from its second position, the solenoid valve stem 61 is moved from the second position, where it engages the second valve seat and allows the compressed oxidizing gas to flow from the air compressor 50 to the second flow passage 76, to the first position, where it engages the first valve seat 64 and disconnects the second flow passage 76 from the air compressor 50 and instead connects the second flow passage 76 to the atmospheric exhaust port 68. In response, the pressure on the upstream end of the duckbill check valve 130 rapidly drops off to the ambient atmospheric pressure. That is, as outlined above, because this ambient atmospheric pressure is less than the pressure of the compressed gas within the air head 40, the pressure differential quickly closes the duckbill portion 132 of the duckbill check valve 130.

Thus, regardless of whether the shuttle valve piston 74 is in the first or second position, the new charge of oxygen-containing gas provided in the air head 40 is not able to flow past the duckbill check valve 130 and out the second flow passage 76. Accordingly, even if the internal pressure within the aeration tank 22 were to be insufficient to drive the shuttle valve piston 74 from the second position, as shown in FIG. 9, to the first position, as shown in FIG. 8, the higher-pressure oxygen-containing gas in the air head 40 could not escape through the aeration head 30, the second flow passage 76, the upstream interior chamber 75, the solenoid valve chamber 63, the atmospheric exhaust port 68 and out to the ambient atmosphere.

Of course, as outlined above, as long as the shuttle valve piston 74 remains in the second position, the poppet valve stem 80 is open, allowing the compressed oxygen-containing gas and/or the water or other fluid 26 contained in the aeration tank 22 to flow through the third flow passage 92, the downstream interior chamber 77 and out the drain line 90. However, assuming the shuttle valve piston 74 is able to substantially freely move between the first and second positions, the pressure in the interior of the aeration tank 22 will press against the downstream face 73 of the shuttle valve piston 74 and rapidly push the shuttle valve piston from the second position to the first position, thus closing off both the second flow passage 76 and the poppet valve orifice 82, disconnecting the interior of the aeration tank 22 from the drain line 90, as shown in FIG. 8.

FIGS. 7-11 also illustrate another benefit of the duckbill check valve 130. That is, as shown in FIG. 9, when the shuttle valve piston 74 is in its second position, the water or other fluid 26 and/or the oxidizing gas flows up the bleed-off tube 87 and through the third flow passage 92 into the downstream interior chamber 77. As shown in FIG. 7, typically, the end of the bleed-off tube 87 is below the level of the water or other fluid 26. The pressure of the oxygen-containing gas in the air head 40 forces the water or other fluid 26 up the bleed-off tube 87 and into the downstream interior chamber 77. While the shuttle valve piston 74 is in the second position, this water or other fluid 26 fills the downstream interior chamber 77 and flows out of the poppet valve orifice 82 into the drain line 90.

In the conventional exemplary embodiment shown in FIGS. 1-6, when the shuttle valve piston 74 returns to the first position, both the second and third flow passages 76 and 92 are connected to the downstream interior chamber 77. Because, in this conventional embodiment, there is nothing which prevents the oxygen-containing gas in the air head 40 from flowing through the aeration head 30 and the second flow passage 76 and into the downstream interior chamber 77, the water or other fluid 26 that is in the downstream interior chamber 77 when the poppet valve stem 80 closes flows down either the bleed-off tube 87 or down the second flow passage 76 and back into the interior of the aeration tank 22, while the oxygen-containing gas fills the downstream interior chamber 77.

In contrast, as shown in FIGS. 7 and 8, the duckbill check valve 130 prevents the oxygen-containing gas from flowing from the aeration head 30 through the second flow passage 76 and into the downstream interior chamber 77 when the shuttle valve piston 74 is in its first position. As a result, the water or other fluid 26 cannot easily escape from the downstream interior chamber 77. Because the level of the water or other fluid 26 in the aeration tank 22 is above the bottom of the bleed-off tube 87, the oxygen-containing gas in the air head 40 also cannot easily enter the downstream interior chamber 77 through the bleed-off tube 87.

Accordingly, either the water or other fluid 26 will remain in the downstream interior chamber 77 or will drain back into the aeration tank 22, leaving behind a vacuum in the downstream interior chamber 77. In either case, unlike the conventional aeration control valve assembly 21 shown in FIGS. 1-6, in the exemplary embodiment of the improved aeration control valve assembly 21 shown in FIGS. 7-12, a mixture of oxygen-containing gas and fluid is not present within the downstream interior chamber 77. As a result, it is difficult, if not impossible, for iron-metabolizing, sulfur-metabolizing and/or manganese-metabolizing bacteria, for example, to grow large colonies in the downstream interior chamber 77.

However, if, as outlined above, proper start-up procedures were not followed, if the solenoid valve 60 cycles while the line pressure is reduced or lost, if the controller 56 fails or if any other failure state that results in a loss of internal pressure in the aeration tank 22 occurs, the improved aeration control valve assembly 21 will avoid losing internal gas pressure in the aeration tank 22 and/or having fluid flow from the aeration tank 22 out the atmospheric exhaust port 68 into the air compressor 50.

That is, even if the supply pressure at the supply inlet 32 is very low, the duckbill check valve 130 will prevent gas, water or other fluid 26 from improperly flowing up the aeration head 30 into the shuttle valve housing 46, through the first flow passage 70, the solenoid valve chamber 63, and out the atmospheric exhaust port 68. In particular, the duckbill check valve 130 prevents gas and/or other fluid from flowing from the downstream side to the upstream side of the duckbill check valve 130. Thus, when the supply fluid flows through the supply inlet 32 at a low pressure that is initially insufficient to push the shuttle valve piston 74 from the second position to the first position begins filling the aeration tank 22, the volume of the air head 40 begins decreasing.

In contrast to the conventional embodiment shown in FIGS. 1-6, in this situation, the duckbill check valve 130 prevents the gas in the air head 40 from exiting the aeration tank 22 via the second and first flow passages 76 and 70, the solenoid valve chamber 63 and the atmospheric exhaust port 68. The air in the air head 40 also cannot exit the aeration tank 22 because the bottom of the bleed-off tube 87 is below the level of the water or other fluid 26. Accordingly, the aeration tank 22 continues to fill, the pressure in the air head 40 continues to increase, closing the duckbill check valve 130 even tighter. Additionally, this increase in the pressure in the air head 40 causes the pressure on the water or other fluid 26 in the interior of the aeration tank 22 to increase, which in turn increases the pressure applied by the water or other fluid 26 on the downstream face 73 of the shuttle valve piston 74 in the downstream interior chamber 77.

In many cases, the aeration tank 22 will fill enough that the pressure in the downstream interior chamber 77 becomes sufficient to drive the shuttle valve piston 74 from the second position to the first position. This is true even if it is necessary to fill the aeration tank 22 and even have the water or other fluid 26 enter the aeration head 30. Because the duckbill check valve 130 prevents any fluid, whether gas, water or the like, from flowing from the aeration head 30 through the second flow passage 76 to the ambient atmosphere, the pressure in the downstream interior chamber 77 will often become sufficient to drive the shuttle valve piston 74 from the second position to the first position. Even if it does not, the water or other fluid 26 is not able to flow out of the solenoid valve chamber 63.

As discussed above, to recharge the aeration tank 22, the solenoid valve 60 has been energized to drive the solenoid valve stem 61 from the first position, where it engaged the first valve seat 64, to the second position, where it engages the second valve seat 66, to allow the compressed oxygen-containing gas to bear against the upstream face of the shuttle valve piston 74. Because the pressure of the compressed oxygen-containing gas is greater than the line pressure of the supplied fluid, the oxygen-containing gas pushes the shuttle valve piston 74 from the first position to the second position, opening the second flow passage 76 to the upstream interior chamber 75 and connecting the downstream interior chamber 77 to the drain line 90.

Accordingly, as shown in FIGS. 9 and 11, this higher-pressure compressed oxygen-containing gas is able to force apart the opposing elastomeric bill portions of the duckbill portion 132 of the duckbill check valve 130. This allows the compressed oxygen-containing gas to flow into the air head 40 of the aeration tank 22 and recharge the aeration tank 22 with a fresh charge of oxygen-containing gas. At the same time, the water or other fluid 26 and/or the oxygen-containing gas is allowed to flow up the bleed-off tube 87 and through the downstream interior chamber 77 and the poppet valve orifice 82, and into the drain line 90.

Additionally, should the solenoid valve 60 fail, such that the solenoid valve stem 61 is in the second position, even if the air compressor 50 is off, or, vice versa, if the air compressor 50 should fail even though the solenoid valve 60 is energized to place the solenoid valve stem 61 in the second position, the duckbill check valve 130 prevents the compressed oxygen-containing gas and/or the water or other fluid 26 from flowing back through the aeration head 30 and the second flow passage 76, the first flow passage 70 and into the solenoid valve chamber 63. That is, if the pressure provided by the air compressor 50 on the upstream face 72 of the shuttle valve piston 74 is lost, the duckbill check valve 130 prevents the compressed oxygen-containing gas already present in the air head 40 and/or the water or other fluid 26 in the aeration tank 22 from backing up through the second flow passage 76. Moreover, because the internal pressure in the aeration tank 22 cannot be relieved through the second flow passage 76, the improved aeration control valve assembly 21 has time to react to the loss of pressure on the upstream face 72, such that the pressure on the downstream face 73 can move the shuttle valve piston 74 from the second position to the first position before that internal pressure is lost through the open drain line 90.

Figure 12:
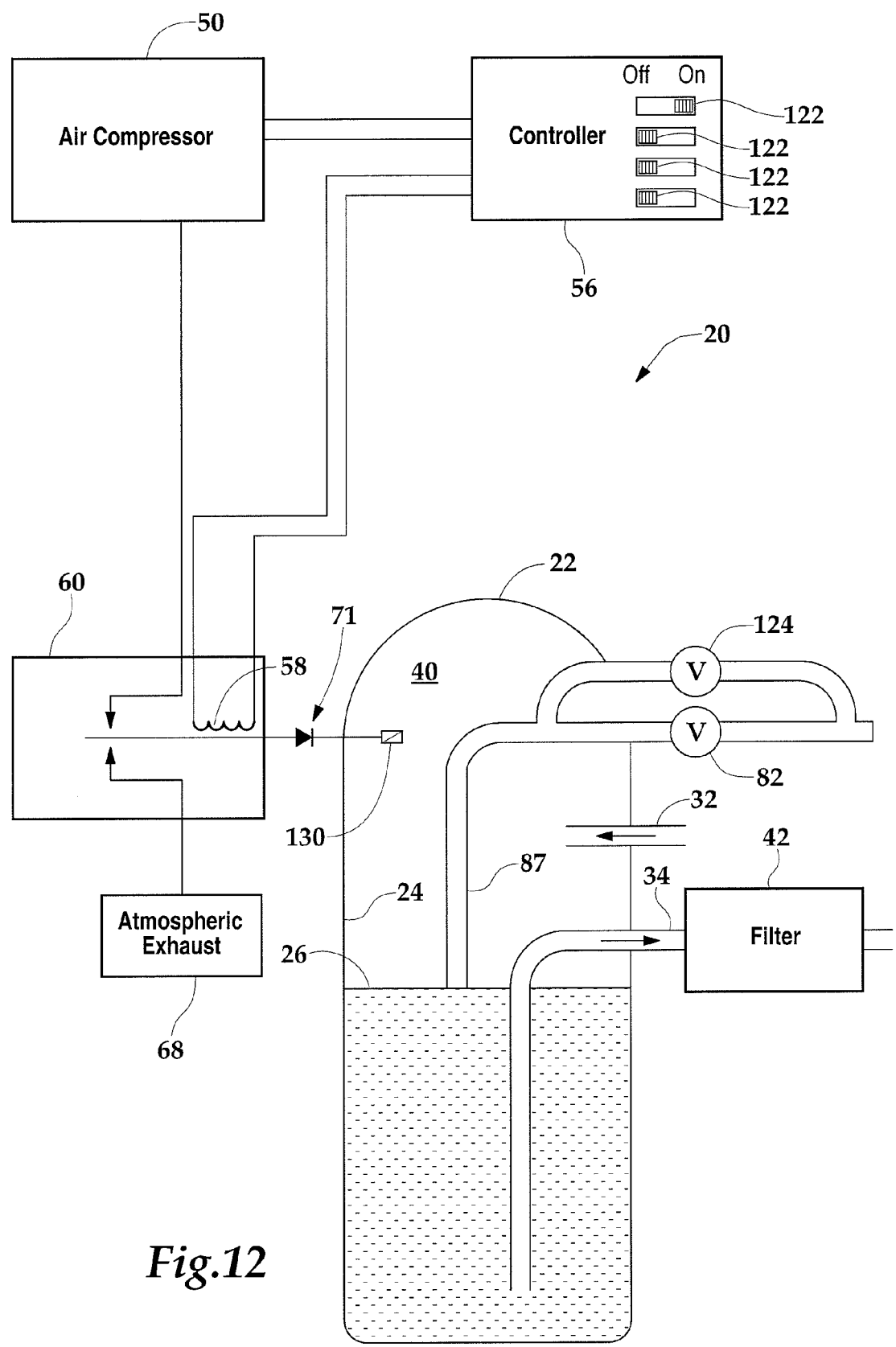
FIG. 12 is a schematic view of the oxidation tank and oxidation tank control valve assembly shown in FIG. 7.

FIG. 12 generally corresponds to FIG. 6, but adds a schematic representation of the duckbill check valve 130 at the downstream end of the interior chamber 71, illustrating the one-way-flow nature of the duckbill check valve 130.

It should be appreciated that, in various other exemplary embodiments, other types of one-way-flow valve structures and devices, such as other types of check valves, ball valves, and the like, can be used to prevent gas and/or the water or other fluid 26 from flowing from the oxidation tank 22 through the second flow passage 76 and the first flow passage 70 and into the solenoid valve chamber 63. It should further be appreciated that one, two or more such one-way-flow valve structures can be implemented. Finally, two or more separate structures which together provide at least one one-way-flow valve function can be used to prevent gas and/or the water or other fluid 26 from flowing from the interior of the aeration tank 22 to the solenoid valve chamber 63. It should furthermore be appreciated that any of these structures can be located at any appropriate point between the interior of the aeration tank 22 and the first flow passage 70 from the solenoid valve chamber 63 to the shuttle valve housing 46.

It should be appreciated that, in the conventional embodiment, the shuttle valve piston 74 is used to prevent gas and/or other fluid from flowing out of the aeration tank 22 through the upstream interior chamber 75. This is accomplished by closing the second flow passage 76 when the shuttle valve piston 74 is in the first position. In the exemplary embodiment shown in FIGS. 7-12, the shuttle valve piston 74 is still used, along with the duckbill check valve 130, to disconnect the second flow passage 76 from the upstream interior chamber 75.

However, in other exemplary embodiments, the duckbill check valve 130 can be used alone to fluidly disconnect the flow of fluid or gas from the aeration tank 22 to the upstream interior chamber 75. In some such exemplary embodiments, the location of the second flow passage 76 in the upstream interior chamber 75 can be modified so that the second flow passage 76 remains within the upstream interior chamber 75 after the shuttle valve piston 74 has been placed in its first position. Alternatively or additionally, the shuttle valve piston 74 can be modified so that, when in its first position, the shuttle valve piston 74 no longer extends over the second flow passage 76, whether the second flow passage 76 is in its current position as shown in FIGS. 7-11 or is moved as outlined above. In either situation, the second flow passage 76 remains in the upstream interior chamber 75.

In various other exemplary embodiments, the shuttle valve piston 74 can be modified so that its primary function is to open the poppet valve, by moving the poppet valve stem 80 from its first position to its second position when the compressed oxygen-containing gas is supplied to the upstream interior chamber 75. In such exemplary embodiments, the shuttle valve piston 74 is modified so that it does not close the second flow passage 76 when in its first position.

In some such exemplary embodiments, the second flow passage 76 and the upstream interior chamber 75 can be completely separate structures that each connect to the first flow passage 70. For example, these structures can form a "T" intersection, with the first flow passage 70 forming, for example, the leg of the T, and the second flow passage 76 and the entrance to the upstream interior chamber 75 forming the arms of the T.

In still other exemplary embodiments, the shuttle valve piston 74 can be replaced with a wall or other separator that divides the interior chamber 71 into the upstream and downstream interior chambers 75 and 77. In this situation, the internal pressure in the aeration tank 22 is used to open the poppet valve. That is, the bias force applied by the spring 96 to the poppet valve stem 80 is modified so that it is just above the line pressure range of the fluid supplied to the supply inlet 32. As a result, when the compressed oxygen-containing gas is supplied to the aeration tank 22 at the higher-than-line pressure, the pressure within the aeration tank 22 increases to that gas pressure. Since this above the line pressure, and thus also above the bias force applied to the poppet valve stem 80 by the spring 96, the poppet valve stem 80 moves from its first position to its second position, connecting the downstream interior chamber 77 to the drain line 90.

Then, when the supply of compressed oxygen-containing gas is removed, the duckbill check valve 130 prevents that compressed gas from flowing back out of the interior of the aeration tank 22 toward the upstream interior chamber 75. At the same time, fluid and/or gas continues to flow through the downstream interior chamber 77 from the aeration tank 22 to the drain line 90. Accordingly, the pressure in the aeration tank 22, and thus in the downstream interior chamber 77, begins to or continues to drop. Eventually, the pressure in the aeration tank 22, and thus the downstream interior chamber 77, drops to the line pressure, or at least below the pressure needed to keep the poppet valve stem 80 in the second position. As a result, the spring 96 moves the poppet valve stem 80 from its second position to its first position, disconnecting the drain line 90 from the downstream interior chamber 77.

In some such exemplary embodiments, the spring 96 presses against an internal wall, ledge, flange or the like within the downstream interior chamber 77 or against a wall defining the downstream interior chamber 77. Likewise, in some such exemplary embodiments, the upstream interior chamber 75 can be replaced with a simple passageway or bore through the shuttle valve housing 46 between the first and second flow passages 70 and 76. In such exemplary embodiments, this passageway or bore can be considered to be part of either the first flow passage 70 or the second flow passage 76.

It should further be appreciated that, in various exemplary embodiments, a secondary source of compressed oxygen-containing gas can be used in place of, or in addition to, the air compressor 50 in the improved aeration control valve assembly 21. That is, in various exemplary embodiments, rather than the air compressor 50, a tank containing a supply of compressed oxygen-containing gas can be used to supply the compressed oxygen containing gas. In other exemplary embodiments, the tank of compressed oxygen-containing gas can be used in conjunction with the air compressor 50. In still other exemplary embodiments, any other known or later-developed device, structure or system usable to supply one or more oxygen-containing gases to the aeration control valve assembly 21 can be used in addition to, or in place of, the air compressor 50 and/or the compressed gas tank.

It should be appreciated that, other sources of compressed air or other oxygen-rich gas, instead of or in addition to the air compressor 50 could be used. It should be appreciated that, in various exemplary embodiments, the controller 56 acts as a timer, and other mechanical and/or electrical timers could be used. It should also be appreciated that the solenoid valve 60 could instead be implemented using a mechanical valve operated by an electrically driven cam or other mechanisms.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. An aeration control apparatus, usable with an aeration tank having an interior, and a compressed gas source that supplies compressed oxidizing gas, the aeration control apparatus comprising:
    a first valve, having
        a first position disconnecting the compressed gas source from a first flow passage and connecting the first flow passage to an atmospheric exhaust, and
        a second position connecting the compressed gas source to the first flow passage and disconnecting the first flow passage from the atmospheric exhaust,
    a valve housing having at least one interior chamber, the first flow passage fluidly connecting the first valve to a first interior chamber of the at least one interior chamber;
    at least one one-way-flow valve, a first one-way-flow valve located between the first interior chamber and the interior of the aeration tank, the first one-way-flow valve oriented to allow the compressed oxidizing gas to flow from the first interior chamber to the interior of the aeration tank and to preclude gas or fluid from flowing from the interior of the aeration tank to the first interior chamber; and
    a controllable actuator operatively connected to the first valve and having a first state usable to place the first valve in the first position and a second state usable to place the first valve in the second position, wherein the controllable actuator is operable to repeatedly switch between the first state and the second state.

2. The aeration control apparatus of claim 1, wherein the valve housing comprises:
    a valve housing body, at least the first interior chamber provided in the valve housing body, the first valve fluidly connected to the valve housing body by the first flow passage;
    an aeration head that is connected to the aeration tank at a first end and is connected to the valve housing body at a second end, wherein in a second flow passage extends from the first interior chamber in the valve housing body, through the aeration head, to the interior of the aeration tank.

3. The aeration control apparatus of claim 2, wherein the first one-way-flow valve is located within at least one of the aeration head and the valve housing body or between the aeration head and the valve housing body.

4. The aeration control apparatus of claim 2, wherein the valve housing further comprises an adaptor that connects the aeration head to the valve housing body, the second flow passage extending through the adaptor.

5. The aeration control apparatus of claim 4, wherein the first one-way-flow valve is located within at least one of the aeration head, the valve housing body and the adaptor, between the aeration head and the adaptor, or between the valve housing body and the adaptor.

6. The aeration control apparatus of claim 1, wherein the first interior chamber is a third flow passage through the valve housing that connects the first and second flow passages.

7. The aeration control apparatus of claim 1, further comprising
    a second valve located in the first interior chamber downstream of the first flow passage and connected to the first valve by the first flow passage, the second valve dividing the first interior chamber into an upstream portion and a downstream portion;
    a second flow passage extending between the upstream portion and the interior of the aeration tank; and
    a third flow passage extending between the interior of the aeration tank and the downstream portion,
    wherein the second valve has:
        a first position disconnecting the third flow passage from a drain line, and
        a second position connecting the third flow passage to the drain line; and
    wherein the second valve is displaceable by gas pressure of the compressed oxidizing gas from the first position to the second position.

8. The aeration control apparatus of claim 7, further comprising a tube that forms a portion of the third flow passage, the tube allowing at least one of fluid and gas to flow from the interior of the aeration tank into the downstream portion.

9. The aeration control apparatus of claim 7, wherein the second valve comprises:
    a valve piston having an upstream face and a downstream face;
    a valve stem positioned at least adjacent to the downstream face of the valve piston, the valve stem having a first position where the valve stem disconnects the downstream portion from the drain line and a second position where the valve stem connects the downstream portion to the drain line, the valve stem operated by the valve piston moving from its first position to its second position to place the valve stem in its second position; and
    a bias element that biases the valve stem against the valve piston.

10. The aeration control apparatus of claim 9, wherein:
    the upstream face of the valve piston is located in the upstream portion and the downstream face of the valve piston is located in the downstream portion;
    the upstream face is exposed to the compressed gas source when the first valve is in the first position; and
    the valve piston is operated by the compressed oxidizing gas from the compressed gas source to move the valve piston from its first position to its second position when the upstream face is exposed to the compressed gas source.

11. The aeration control apparatus of claim 10, wherein the valve stem comprises a valve seal positioned on and engagable with a valve seat formed in the valve housing;

the valve stem, when in its first position, engages the valve seal with the valve seat to disconnect the downstream portion from the drain line and, when in its second position, disengages the valve seal from the valve seat to connect the downstream portion to the drain line.

12. The aeration control apparatus of claim 10, wherein the valve stem, in addition to being operated by the valve piston, is responsive to pressure within the interior of the aeration tank to move from its first position to its second position to connect the downstream portion to the drain line or to maintain the valve stem in its second position, independent of the position of the valve piston.

13. The aeration control apparatus of claim 12, wherein the valve stem further comprises a pressure receiving portion located within the downstream portion, the pressure receiving portion responsive to the pressure within the interior of the aeration tank to move from its first position to its second position or to maintain the valve stem in its second position.

14. The aeration control apparatus of claim 10, wherein
the downstream face is exposed to an internal pressure within the downstream portion from the interior of the aeration tank, and
when a pressure on the upstream face is less than the internal pressure within the downstream portion that the downstream face is exposed to, the valve piston is operated by the internal pressure within the downstream portion to move the valve piston from its second position to its first position.

15. The aeration control apparatus of claim 7, wherein the second valve, when in its first position, disconnects the second flow passage from the upstream portion, and, when in its second position, connects the second flow passage to the upstream portion.

16. The aeration control apparatus of claim 15, wherein:
the second valve, when in its first position, connects the second flow passage to the downstream portion; and
the first one-way-flow valve holds fluid within the downstream portion of the first interior chamber.

17. The aeration control apparatus of claim 1, wherein the one-way-flow valve is a check valve.

18. The aeration control apparatus of claim 1, wherein the one-way-flow valve is a duckbill check valve.

19. The aeration control apparatus of claim 18, wherein the duckbill check valve comprises a base and a pair of opposing elastically-deformable portions extending from the base, the duckbill check valve positioned and oriented relative to the first valve and the aeration tank such that the base is upstream of the pair of opposing elastically-deformable portions.

20. The aeration control apparatus of claim 18, wherein the duckbill check valve comprises a base having an opening and a pair of opposing elastically-deformable portions extending from the base, a flow passage extending from the opening and provided between the pair of opposing elastically-deformable portions, such that, when a pressure at the opening of the base is greater than a pressure applied to an outer surface of the pair of opposing elastically-deformable portions, gas or fluid to flow is able to flow through the flow passage and when a pressure at the opening of the base is less than a pressure applied to the outer surface of the pair of opposing elastically-deformable portions, gas or fluid to flow is not able to flow through the flow passage, the duckbill check valve oriented such that the base is upstream of the pair of opposing elastically-deformable portions.

21. The aeration control apparatus of claim 1, wherein the valve housing further comprises a second flow passage that fluidly connects the first interior chamber to the interior of the aeration tank, wherein the first one-way-flow valve is located within at least one of the first interior chamber and the second flow passage, the first one-way-flow valve oriented to allow the compressed oxidizing gas to flow from the first valve to the interior of the aeration tank through the second flow passage and to preclude gas or fluid from flowing from the interior of the aeration tank to the first valve through at least the second flow passage.

22. A fluid filtration apparatus usable to remove oxidizable contaminants from a supply of fluid, comprising:
an aeration tank having an interior;
a valve housing connected at least to the aeration tank, a fluid supply source and a drain line;
a compressed gas source that supplies compressed oxidizing gas;
a controllable valve controllably connecting the compressed gas source to an interior chamber within the valve housing via a first flow passage and having a first position connecting the compressed gas source to the first flow passage and disconnecting the first flow passage from an atmospheric exhaust, and a second position disconnecting the compressed gas source from the first flow passage and connecting the first flow passage to the atmospheric exhaust;
a second flow passage fluidly connecting the interior chamber to the interior of the aeration tank;
a one-way-flow valve located in at least one of the interior chamber and the second flow passage, the one-way-flow valve oriented to allow the compressed oxidizing gas to flow from the controllable valve to the interior of the aeration tank through the second flow passage and to preclude gas or fluid from flowing from the interior of the aeration tank to the controllable valve through at least the second flow passage; and
a controller operably connected to the controllable valve to operate the controllable valve between the first and second positions.

23. An aeration tank control valve assembly usable with an aeration tank and a compressed gas source that supplies compressed oxidizing gas, comprising:
a valve housing, portions of the valve housing defining an interior chamber, the interior chamber separated into upstream and downstream portions, and a first flow passage, a second flow passage and a third flow passage, the first flow passage opening into the upstream portion of the interior chamber, the third flow passage opening into the downstream portion of the interior chamber and the second flow passage opening into at least the upstream portion of the interior chamber, wherein the valve housing is connectable to the aeration tank such that the second and third flow passages are able to communicate with an interior of the aeration tank;
a tube connected to the valve housing that is extendable into the interior of the aeration tank and that communicates with the downstream portion of the interior chamber via the third flow passage;
a first valve connected to the valve housing and communicating with the upstream portion of the interior chamber via the first flow passage, the first valve having a first position fluidly connecting the compressed gas source to the first flow passage and disconnecting the first flow passage from an atmospheric exhaust, and a second position disconnecting the compressed gas source from the first flow passage and fluidly connecting the first flow passage to the atmospheric exhaust;
a one-way-flow valve located relative to the second flow passage, the one-way-flow valve oriented to allow gas and fluid to flow from at least the first flow passage through the one-way-flow valve and to preclude gas and fluid from flowing through the one-way-flow valve into at least the first flow passage;

a controllable actuator operatively connected to at least the first valve, the controllable actuator having a first state that causes at least the first valve to assume its first position to provide the compressed oxidizing gas to the valve housing via the first flow passage and a second state that causes the first valve to assume its second position, wherein the controllable actuator is operable to repeatedly switch between the first state and the second state.

24. An aeration tank control valve assembly usable with an aeration tank, the aeration tank having an interior and a compressed gas source that supplies compressed oxidizing gas, the aeration tank control valve assembly comprising:

a first valve, the first valve connectable to the compressed gas source;

first valve;

a valve housing downstream of the first valve, portions of the valve housing defining an interior chamber, the interior chamber separated into upstream and downstream portions, and a first flow passage, a second flow passage and a third flow passage, the first flow passage opening into the upstream portion of the interior chamber and connecting the first valve to the upstream portion, the third flow passage opening into the downstream portion of the interior chamber and the second flow passage opening into at least the upstream portion of the interior chamber, wherein the valve housing is connectable to the aeration tank such that the second and third flow passages are able to communicate with the interior of the aeration tank;

wherein the first valve has:
  a first position disconnecting the compressed gas source from the first flow passage and connecting the first flow passage to an atmospheric exhaust, and
  a second position connecting the compressed gas source to the first flow passage and disconnecting the first flow passage from the atmospheric exhaust;

at least one one-way-flow valve, a first one-way-flow valve located relative to the second flow passage and oriented to allow the compressed oxidizing gas to flow from the upstream portion of the interior chamber to the interior of the aeration tank through the second flow passage and to preclude gas or fluid from flowing from the interior of the aeration tank to the upstream portion through the second flow passage; and a controllable actuator operatively connected to the first valve and having a first state usable to place the first valve in the first position and a second state usable to place the first valve in the second position, wherein the controllable actuator is operable to repeatedly switch between the first state and the second state.

25. An aeration control apparatus, connectable between an aeration tank, a compressed gas source that supplies compressed oxidizing gas and a drain; the aeration control apparatus comprising a first valve;

a valve housing having an interior chamber that is downstream from, and connected by a first flow passage to, the first valve, and upstream of, and connected by a second flow passage to, the aeration tank; and a one-way-flow valve located downstream of the first valve and upstream of the aeration tank, a controllable actuator operatively connected to at least the first valve, wherein:

the first valve is displaceable between a first position where the first flow passage is disconnected from the compressed gas source and is connected to an ambient atmosphere and a second position where the first flow passage is connected to the compressed gas source and disconnected from the ambient atmosphere;

the one-way-flow valve is positioned and oriented to allow compressed oxidizing gas to flow from the compressed gas source into the aeration tank and to check gas or fluid from flowing from the aeration tank into the first valve;

the controllable actuator, when in a first state, operates the first valve to displace the first valve from the first position to the second position and, when in a second state, does not operate the first valve, such that the first valve is in, or returns from the second position to, the first position, wherein the controllable actuator is operable to repeatedly switch between the first state and the second state;

upon the first valve being displaced into the second position to connect the compressed gas source to the first flow passage, the compressed oxidizing gas supplied by the compressed gas source flows from the first flow passage, the interior chamber, the second flow passage and the one-way-flow valve; and the one-way-flow valve checks fluid or compressed oxidizing gas from flowing from the second flow passage into the first flow passage.

26. A water filtration apparatus usable to remove oxidizable contaminants from a fluid containing such oxidizable contaminants, comprising:

an aeration tank;

a compressed gas source usable to supply compressed oxidizing gas to the aeration tank;

a valve housing connected to the aeration tank, a first flow passage extending between an interior chamber within the valve housing and the aeration tank;

a controllable valve that controllably connects the compressed gas source to the valve housing, a second flow passage extending between the interior chamber within the valve housing and the controllable valve;

an actuator operably connected to the controllable valve to move the controllable valve between a first position where the compressed oxidizing gas is provide to the second flow passage and a second position where the compressed oxidizing gas is not provided to the second flow passage; and a one-way-flow valve positioned relative to the interior chamber, the first flow passage and the aeration tank to allow compressed oxidizing gas to flow from the controllable valve to the aeration tank and to check at least one of gas and fluid from flowing from the aeration tank through at least the second flow passage to the controllable valve.

27. An aeration tank control valve assembly usable with an aeration tank, comprising:

an aeration head having a base that mounts to an opening in the aeration tank, the aeration head having a fluid inlet and a fluid outlet that communicate with the opening in the aeration tank;

a diffuser supported at the base of the aeration head in communication with the fluid inlet and the aeration tank;

a first tube communicating with the fluid outlet and extendable into the aeration tank;

a valve body mounted to the aeration head, the valve body defining an interior chamber, wherein portions of the valve body and the aeration head define a first flow passage that extends between the interior chamber and the base;

a compressed gas source supplying compressed oxidizing gas;

a first valve connected to the valve body and communicating with the interior chamber via a second flow passage;

a one-way-flow valve located relative to the first flow passage to allow compressed oxidizing gas to flow from the compressed gas source into the aeration tank and to check gas or fluid from flowing from the aeration tank into the first valve;

an actuator operatively connected to at least the first valve, wherein:

the first valve is displaceable between a first position disconnecting the second flow passage from the compressed gas source and connecting the second flow passage to an atmospheric exhaust and a second position disconnecting the second flow passage from the atmospheric exhaust and connecting the aeration tank to the compressed gas source via the second flow passage;

the actuator, when in a first state, operates the first valve to displace the first valve from the first position into the second position, and, when in a second state, does not operate the first valve, such that the first valve is in, or returns from the second position to, the first position, wherein the actuator is operable to repeatedly switch between the first state and the second state: and the one-way-flow valve checks the fluid or the compressed oxidizing gas within the aeration tank from flowing through at least the second flow passage into the first valve.

* * * * *